(12) United States Patent
Kitashou

(10) Patent No.: US 8,743,133 B2
(45) Date of Patent: Jun. 3, 2014

(54) IMAGE PROCESSING SYSTEM, IMAGE PROCESSING METHOD, AND PROGRAM

(75) Inventor: Tetsurou Kitashou, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 967 days.

(21) Appl. No.: 12/488,933

(22) Filed: Jun. 22, 2009

(65) Prior Publication Data

US 2009/0322946 A1 Dec. 31, 2009

(30) Foreign Application Priority Data

Jun. 30, 2008 (JP) ................................ 2008-171736

(51) Int. Cl.
*G06F 12/02* (2006.01)
*H04N 5/46* (2006.01)
*G06F 3/00* (2006.01)
*G06F 13/00* (2006.01)
*H04N 5/445* (2011.01)

(52) U.S. Cl.
USPC .............................. 345/565; 348/558; 725/38

(58) Field of Classification Search
CPC .............. H04N 2005/4417; H04N 2005/4439; H04N 5/4403; H04N 5/44582
See application file for complete search history.

(56) References Cited

U.S. PATENT DOCUMENTS

2006/0031943 A1* 2/2006 Schultz ........................... 726/29
2007/0132727 A1* 6/2007 Garbow et al. ............... 345/157

FOREIGN PATENT DOCUMENTS

JP        11-225301 A    8/1999
JP        2004-247954 A   9/2004

* cited by examiner

*Primary Examiner* — Kee M Tung
*Assistant Examiner* — Frank Chen
(74) *Attorney, Agent, or Firm* — Canon U.S.A., Inc. IP Division

(57) ABSTRACT

An image processing apparatus according to the present invention includes a plurality of input units configured to correspond to respective image data items to be obtained, an obtaining unit configured to obtain the image data items corresponding to the input units when the input units are operated, a determination unit configured to determine, when one of the input units is operated within a predetermined period of time, layout for displaying a corresponding one of the image data items in a display unit, and configured to determine, when at least two of the input units are operated within the predetermined period of time, layout for displaying image data items corresponding to the operated input units in the display unit in parallel, and an output unit configured to generate display data for a single screen using at least one of the image data items obtained using the obtaining unit in accordance with the layout determined using the determination unit and output the display data to the display unit.

16 Claims, 24 Drawing Sheets

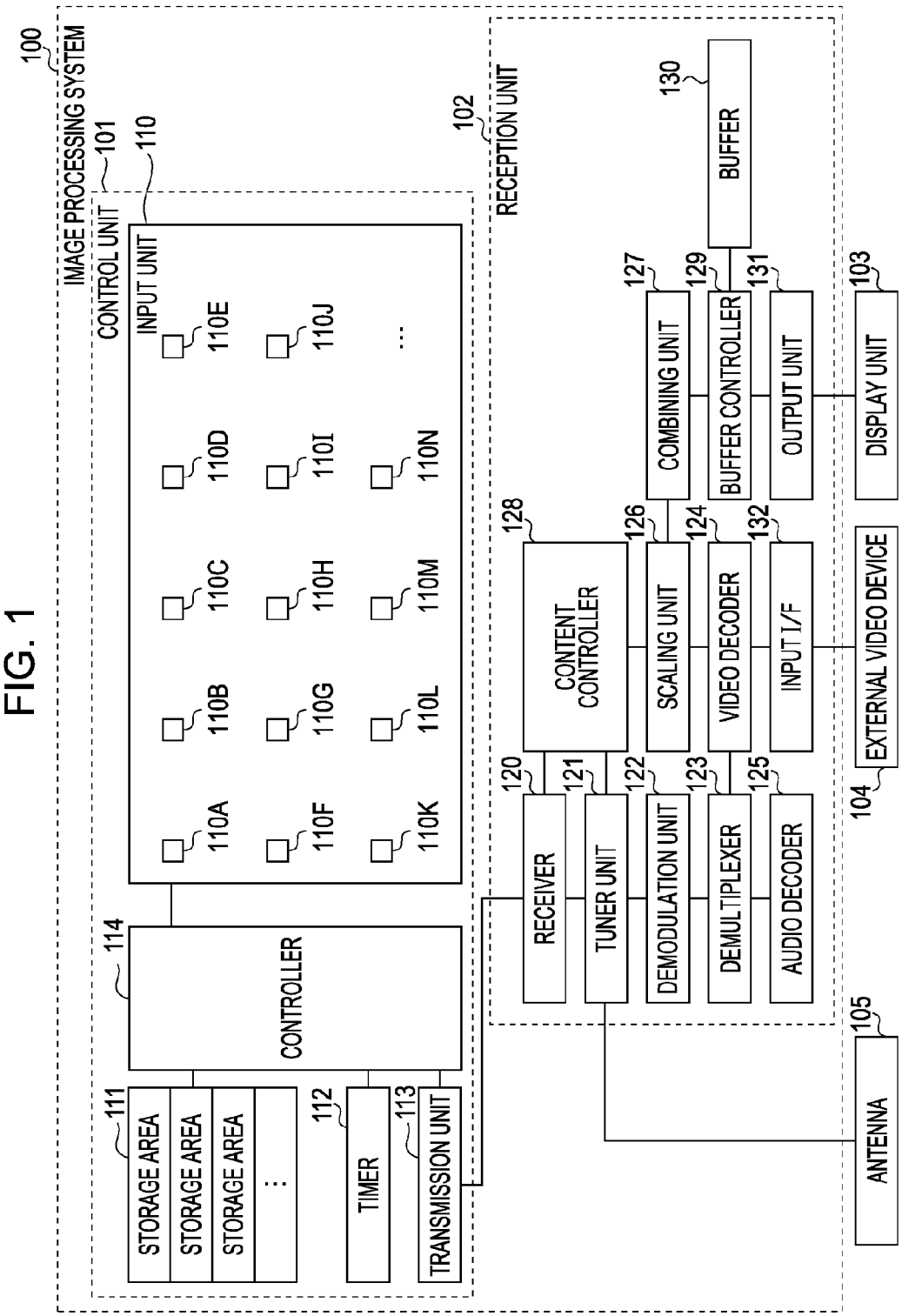

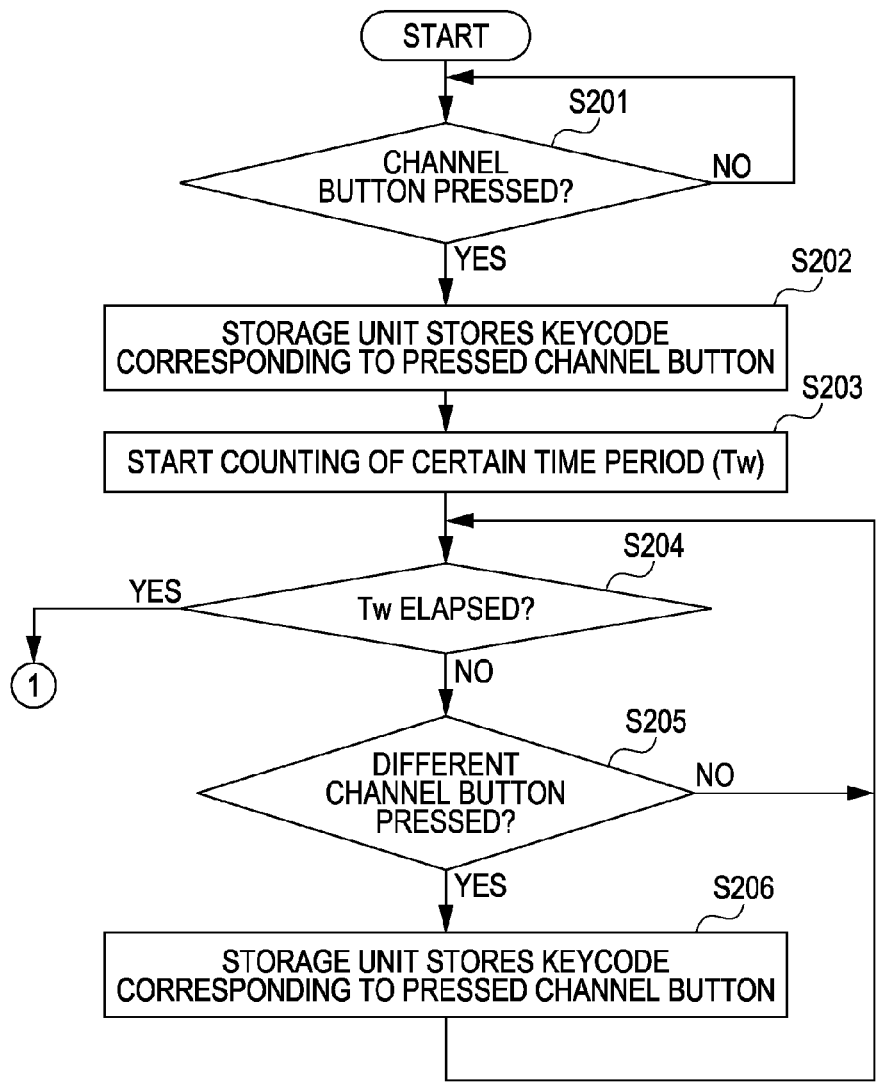

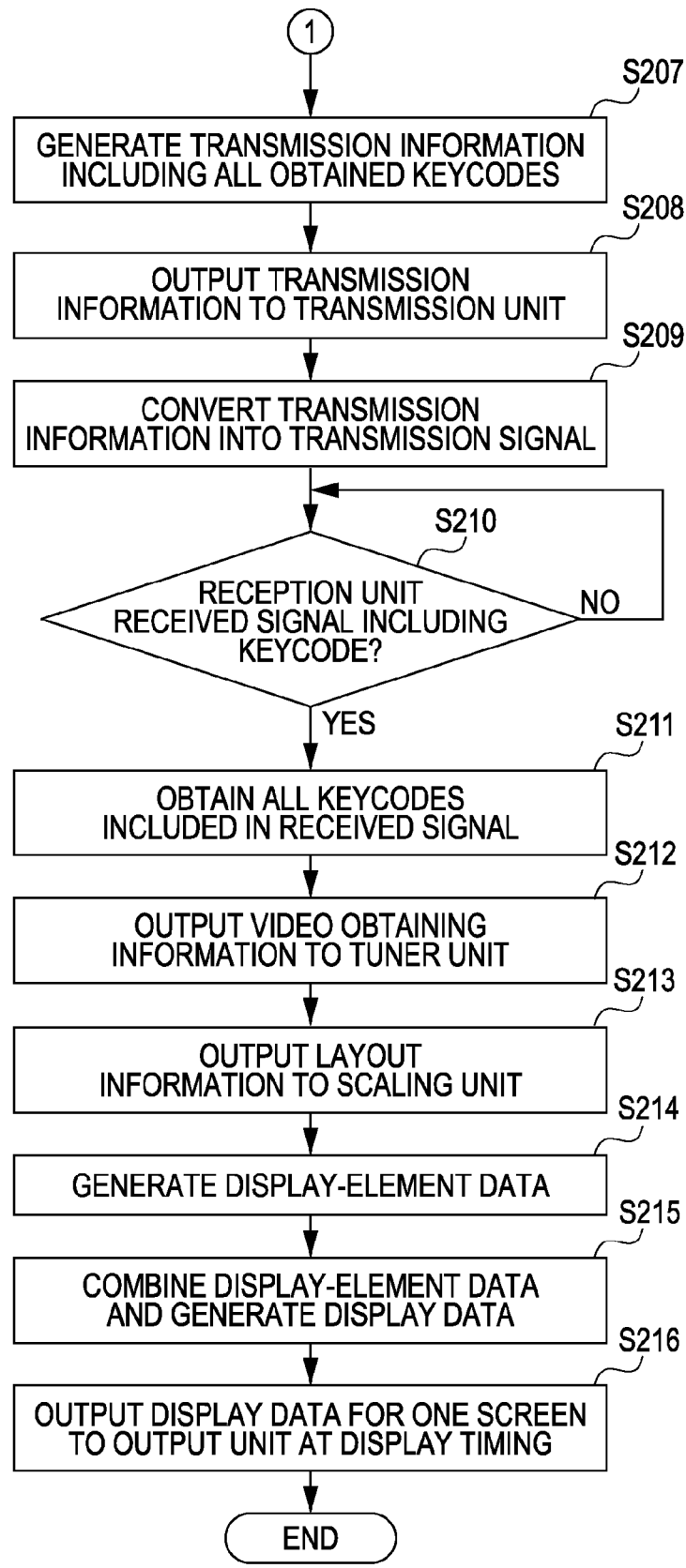

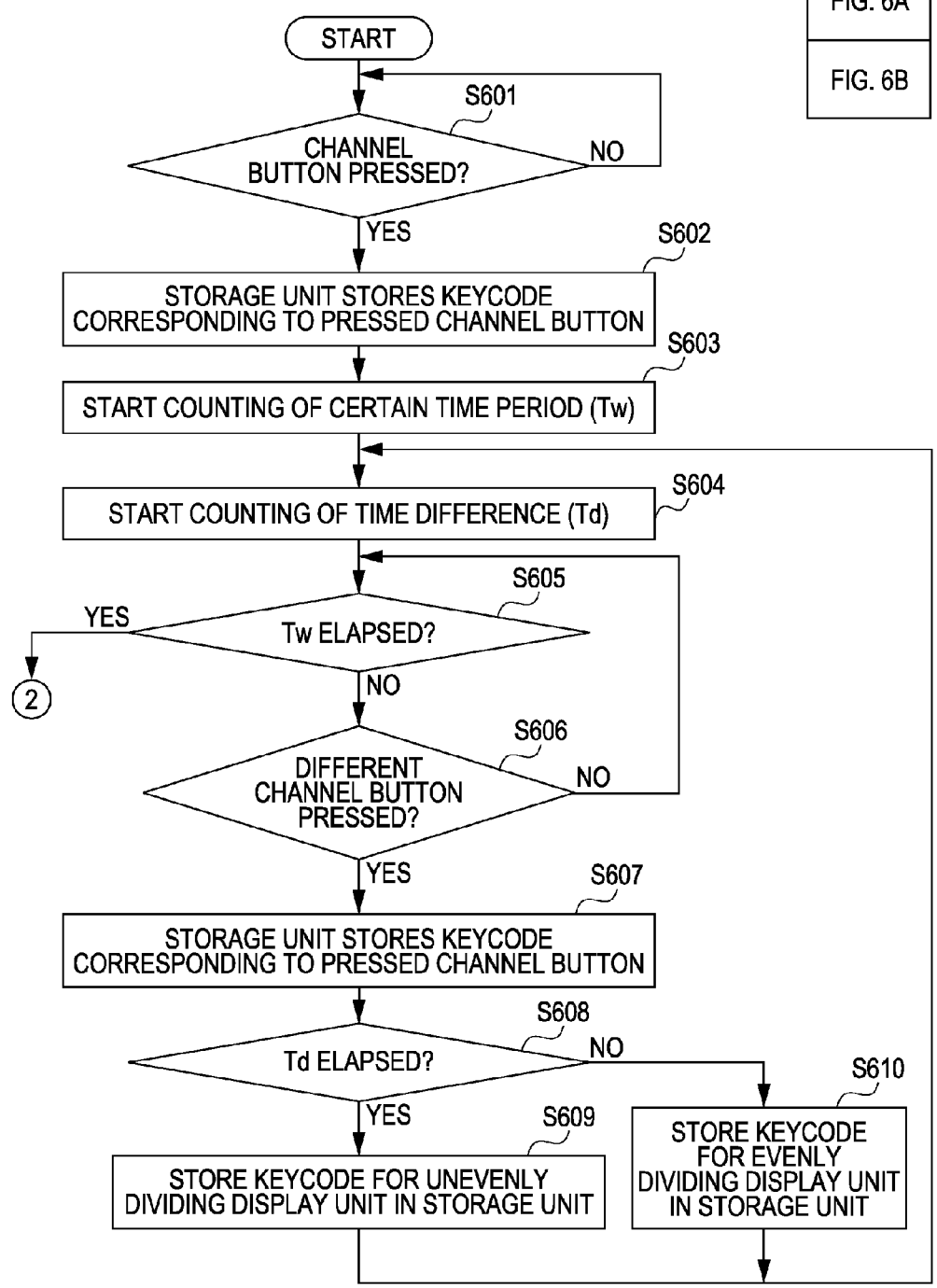

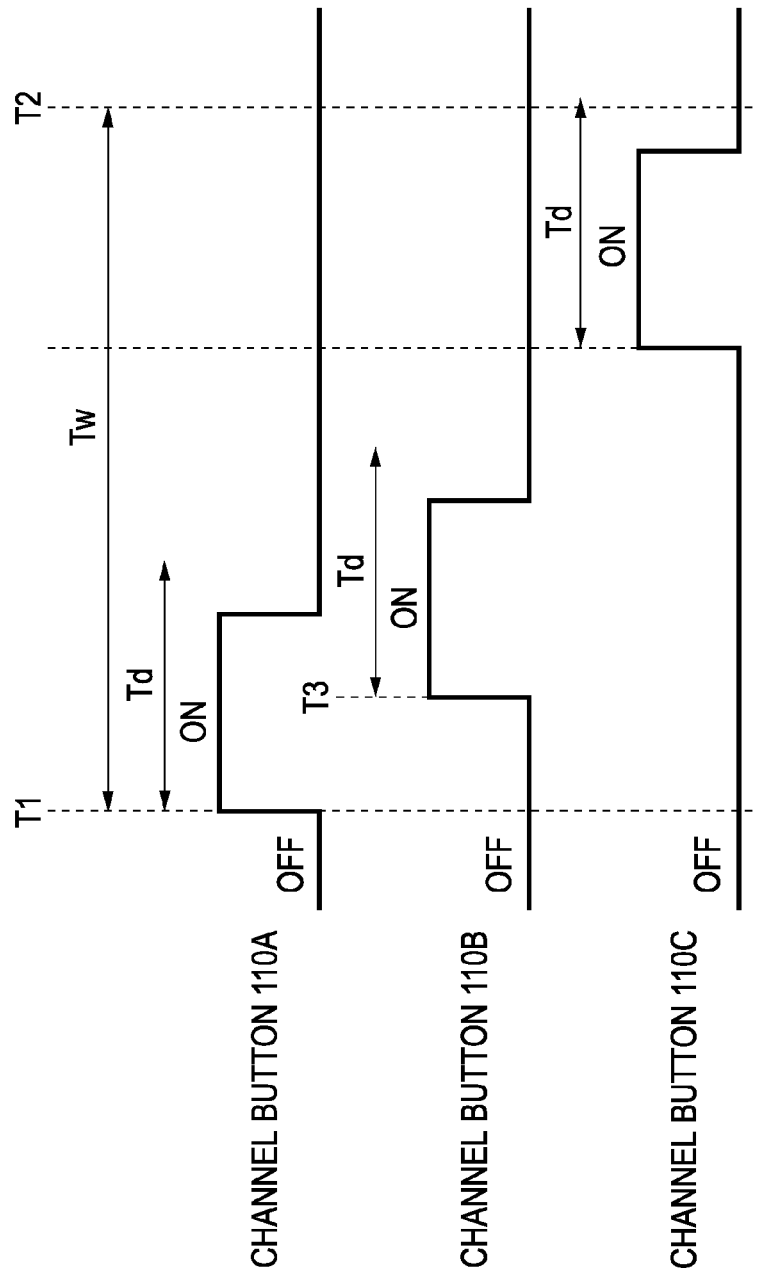

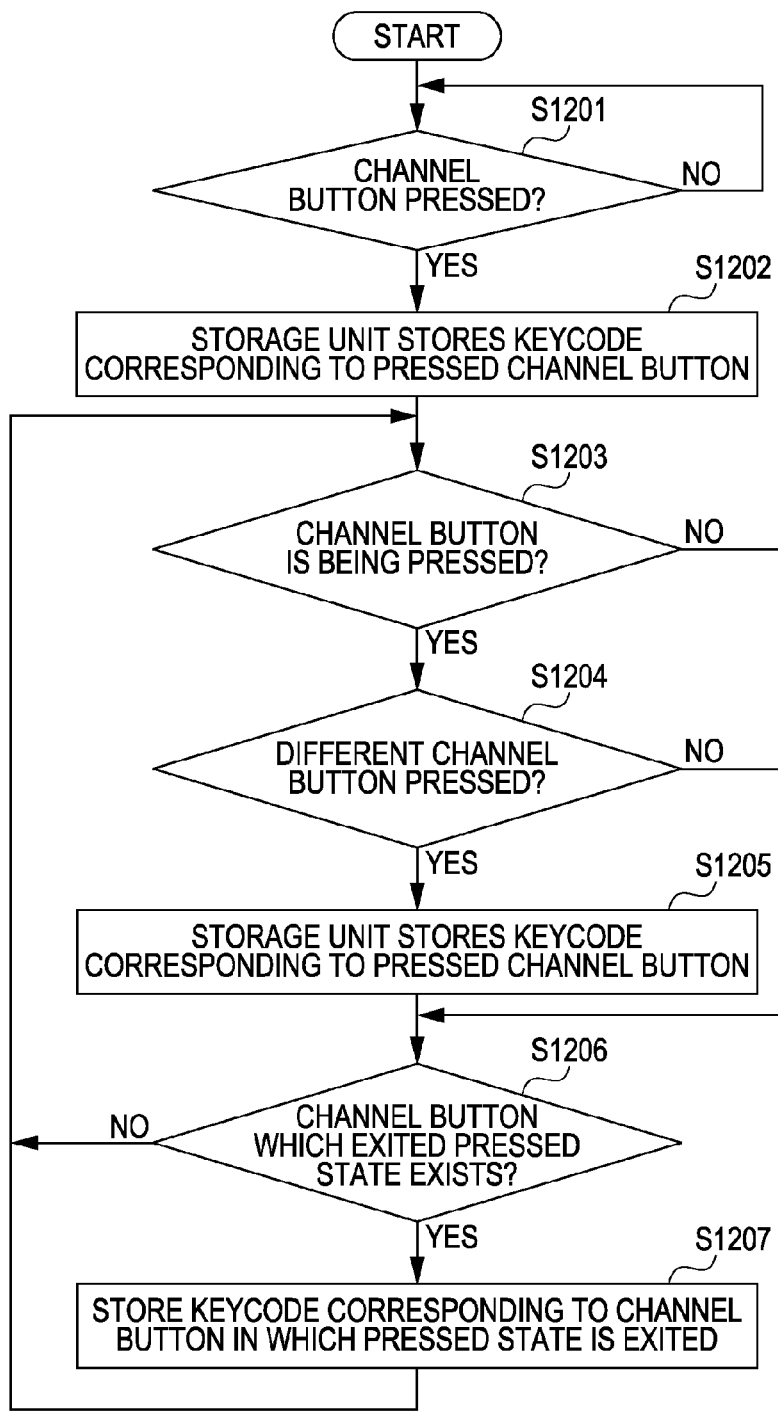

CHANNEL BUTTON 110A

CHANNEL BUTTON 110B

TRANSMISSION INFORMATION

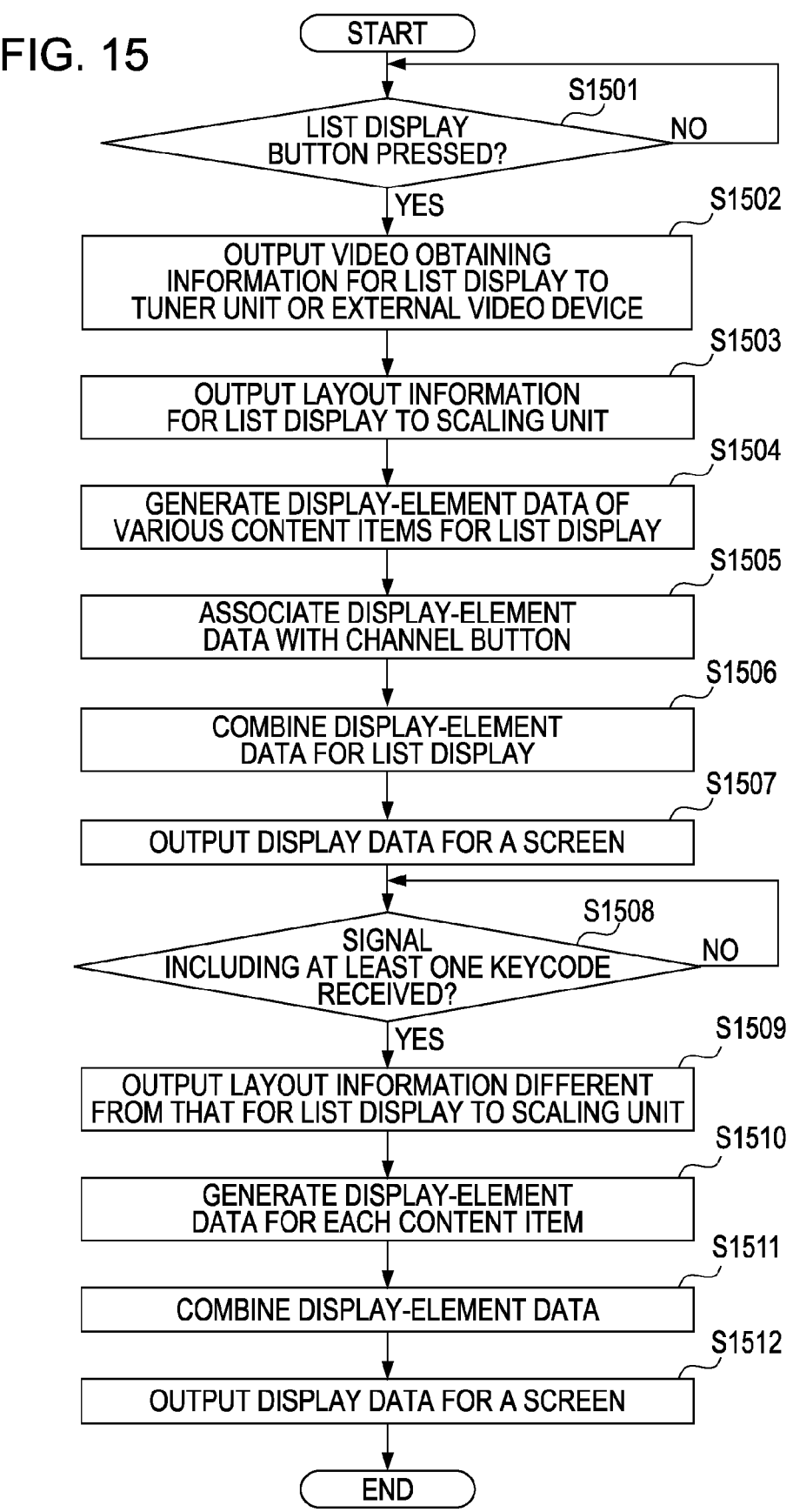

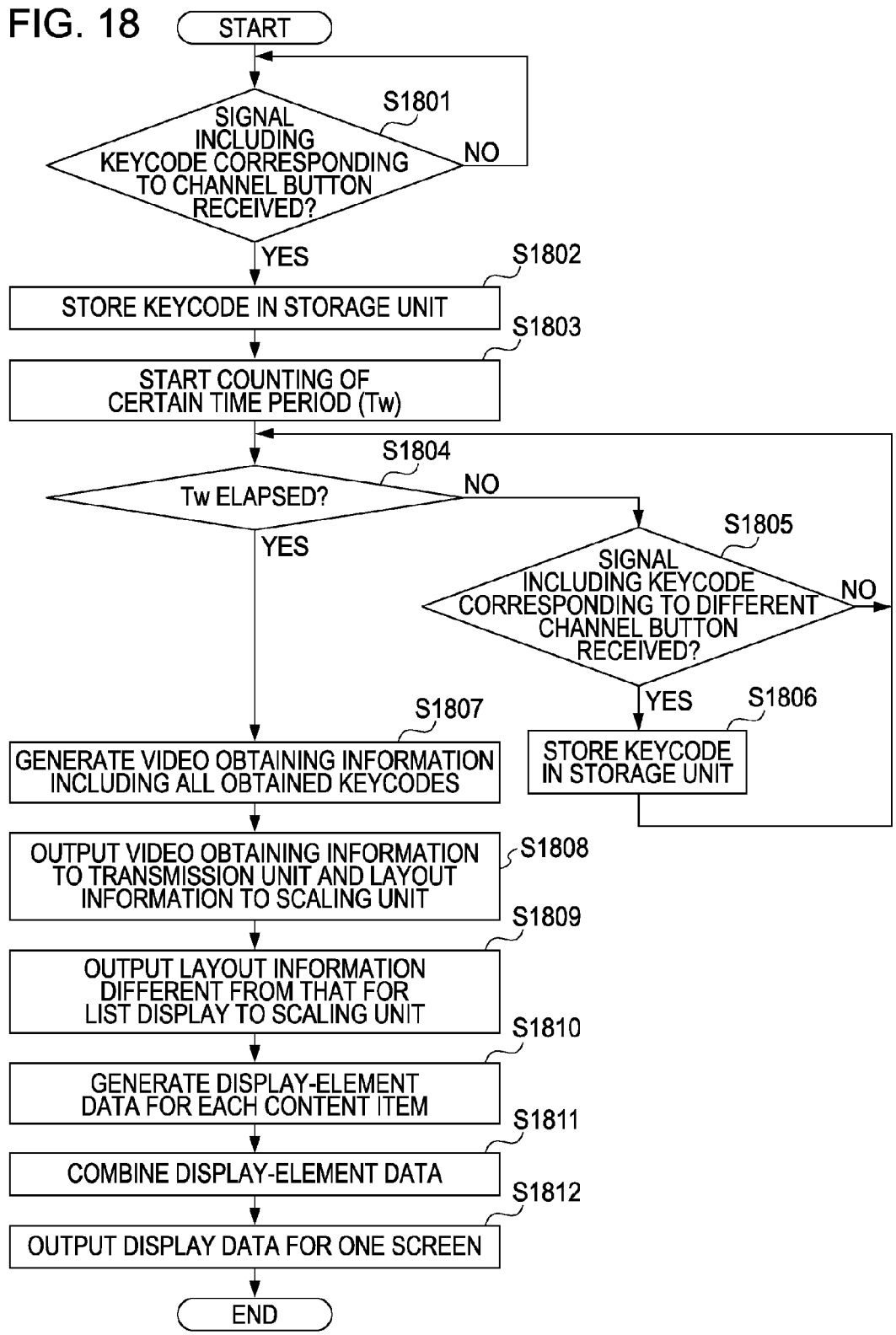

IMAGE PROCESSING SYSTEM, IMAGE PROCESSING METHOD, AND PROGRAM

BACKGROUND OF THE INVENTION

1. Field of the Invention

The present invention relates to a technique of displaying a plurality of screens in a single display unit.

2. Description of the Related Art

Known functions of display units, such as liquid crystal displays, include a function of simultaneously displaying a plurality of images in a single display screen (hereinafter referred to as a "multi-screen display function").

As the multi-screen display function, PinP (Picture in Picture) and PoutP (Picture out Picture) are known, for example.

In recent years, the number of images simultaneously displayed by means of the multi-screen display function and a layout form of the images have become diverse.

Hereinafter, an example of a procedure of the multi-screen display function operated by a user will be described.

In a case where a plurality of broadcast programs are displayed in a single screen, the user operates remote controller so that a screen display mode is switched from a single-screen display mode (a mode in which a single broadcast program is displayed in a single screen) to a multi-screen display mode.

Note that when the multi-screen display mode is selected, a plurality of regions for displaying a plurality of broadcast programs are defined in the screen.

The user operates the remote controller so as to select one of the regions displayed in the screen.

Then, the user allocates a desired broadcast program to the selected region.

As another example of a procedure of the multi-screen display function operated by the user, a display-layout selection apparatus which has a function of automatically changing display layout is disclosed in Japanese Patent Laid-Open No. 11-225301.

In addition, Japanese Patent Laid-Open No. 2004-247954 discloses a technique of automatically performing multi-screen display when a user frequently presses channel buttons of a television set.

In this multi-screen display function, there arises a problem in that as the number of content items which are simultaneously displayed increases, an operation for selecting display regions and an operation for allocating broadcast programs become complicated.

SUMMARY OF THE INVENTION

The present invention provides a function of displaying a plurality of content items desired by a user as multi-screen display by a simple operation.

Furthermore, the present invention provides an image processing system including a plurality of input units configured to correspond to respective image data items to be obtained, an obtaining unit configured to obtain the image data items corresponding to the input units when the input units are operated, a determination unit configured to determine, when one of the input units is operated within a predetermined period of time, layout for displaying a corresponding one of the image data items in a display unit, and configured to determine, when at least two of the input units are operated within the predetermined period of time, layout for displaying image data items corresponding to the operated input units in the display unit in parallel, and an output unit configured to generate display data for a single screen using at least one of the image data items obtained using the obtaining unit in accordance with the layout determined using the determination unit and output the display data to the display unit.

According to the present invention, a plurality of content items desired by a user are displayed in a single screen as multi-screen display by a simple operation.

Further features of the present invention will become apparent from the following description of exemplary embodiments with reference to the attached drawings.

BRIEF DESCRIPTION OF THE DRAWINGS

FIG. 1 is a block diagram illustrating an example of a configuration of an image processing system according to a first embodiment of the present invention.

FIG. 2 is a flowchart illustrating an example of a processing operation performed by the image processing system according to the first embodiment of the present invention.

FIG. 7 is a diagram illustrating the relationships between the states of the channel buttons and Tw timekeeping and Td timekeeping.

FIG. 15 is a flowchart illustrating an example of a processing operation of the image processing system according to the third embodiment of the present invention.

FIG. 18 is a flowchart illustrating an example of a processing operation of the image processing system according to the fourth embodiment of the present invention.

DESCRIPTION OF THE EMBODIMENTS

Figure 3:
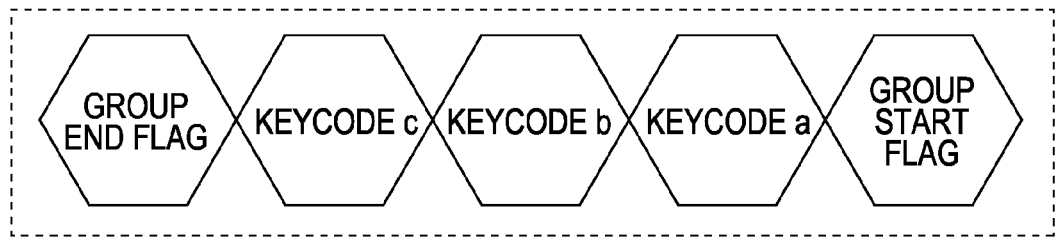
FIG. 3 is a diagram illustrating an example of a format of transmission information.

Image processing systems of embodiments of the present invention are applicable to television tuners and television recording apparatuses, for example.

FIG. 1 is a block diagram illustrating an example of a configuration of an image processing system 100 according to a first embodiment of the present invention.

In FIG. 1, the image processing system 100 includes two apparatuses, i.e., a control unit 101 and a reception unit 102. Configurations of the two apparatuses will be described hereinafter.

A reference numeral 103 denotes a display unit, such as a flat panel display having a matrix electrode structure, or a CRT (Cathode Ray Tube) display.

A reference numeral 104 denotes an external video device, such as a DVD player or a hard disk recorder, and a reference numeral 105 denotes an antenna which receives television broadcast signals which are high frequency signals transmitted from broadcast stations, for example.

A configuration of the control unit 101 will be described hereinafter.

The control unit 101 includes an input unit 110, a storage unit 111, a timer 112, a transmission unit 113, and a controller 114.

The input unit 110 is a user interface operated by a user for controlling the control unit 101.

The user interface corresponds to an operation panel including a plurality of buttons (channel buttons 110A to 110L and volume buttons 110M and 110N). When the user operates these buttons, the reception unit 102 is operated.

Note that keycodes a to l used to specify predetermined broadcast channels are assigned to the channel buttons 110A to 110L, and keycodes m and n used to change volume are assigned to the volume buttons 110M and 110N.

The channel button 110A corresponds to the keycode a, the channel button 110B corresponds to the keycode b, and the channel button 110C corresponds to the keycode c.

When the user presses one of the channel buttons 110A to 110L, a keycode corresponding to the pressed channel button is stored in the storage unit 111. Note that the storage unit 111 includes a plurality of storage areas for storing the keycodes.

The timer 112 starts timekeeping when one of the channel buttons 110A to 110L is first pressed after a predetermined period of time in which the channel buttons 110A to 110L are not operated has elapsed.

The transmission unit 113 is constituted by a wireless/wired LAN (Local Area Network) adapter, an infrared light-emitting device, and a radio-wave transmitting device, for example. The transmission unit 113 converts transmission information supplied from the controller 114 into a transmission signal and transmits the transmission signal to the reception unit 102.

The controller 114 controls operations of the input unit 110, the storage unit 111, the timer 112, and the transmission unit 113, reads the keycodes stored in the storage unit 111 and timekeeping information of the timer 112 so as to generate the transmission information to be supplied to the transmission unit 113.

A configuration of the reception unit 102 will be described hereinafter.

The reception unit 102 includes a receiver 120, a tuner unit 121, a demodulation unit 122, a demultiplexer 123, a video decoder 124, an audio decoder 125, and a scaling unit 126.

The reception unit 102 further includes a combining unit 127, a content controller 128, a buffer controller 129, a buffer 130, and an output unit 131.

The reception unit 102 may include an input interface 132 which accepts signals output from the external video device 104.

When the external video device 104 outputs image data, the input interface 132 supplies the image data to the video decoder 124.

The receiver 120 is constituted by a wireless/wired LAN adapter, an infrared light-emitting device, and a radio wave transmitting device, for example. The receiver 120 receives a signal output from the transmission unit 113 of the control unit 101, converts the received signal into reception information, and supplies the reception information to the content controller 128.

The tuner unit 121 has a band filter which selects a signal of a certain broadcast channel to be viewed from among television broadcast signals received using the antenna 105.

The demodulation unit 122 converts the signal of a broadcast channel selected using the tuner unit 121 into certain content information suitable for a transmission form. Furthermore, the demodulation unit 122 performs processing of correcting errors of content information.

Note that the content information corresponds to packet data obtained by dividing an elementary stream complying with MPEG-2 (Moving Picture Experts Group phase 2) into pieces having appropriate sizes and packetizing the pieces.

The demultiplexer 123 divides the content information into image data and audio data, for example.

The video decoder 124 decodes image data input from the demultiplexer 123 or the input interface 132, and converts the image data into display-element data having a raster scan format which is a display format.

The audio decoder 125 decodes audio data, converts the audio data into audio-signal information, and outputs the audio-signal information to acoustic apparatuses such as an amplifier and a speaker. Note that the audio-signal information is subjected to predetermined operations in the amplifier and the speaker so as to be output as sound.

The scaling unit 126 determines layout parameters such as a scaling rate, a display position, transparency, and a display priority (the relationship between foreground and background) for the display-element data output from the video decoder 124.

Note that the tuner unit 121, the demodulation unit 122, the demultiplexer 123, the video decoder 124, and the scaling unit 126 can process a plurality of content information items demodulated from signals corresponding to a plurality of broadcast channels in parallel.

When a plurality of display-element data items received from two or more broadcast channels are input to the combining unit 127, the combining unit 127 combines the display-element data items in an output rate in synchronization with a horizontal and vertical synchronization signal of the display unit 103.

Furthermore, the combining unit 127 outputs display data obtained by combining the display-element data items to the buffer controller 129. Note that when a single display-element data item is supplied to the combining unit 127, the display-element data item is supplied to the buffer controller 129 as display data.

The content controller 128 controls operations of the receiver 120, the tuner unit 121, and the scaling unit 126.

The buffer controller 129 controls the buffer 130 so that the display data is temporarily stored in the buffer 130 in accordance with an output rate, and outputs the display data for a single screen from the buffer 130 to the output unit 131 at a timing in which the display data is displayed in the display unit 103.

The output unit 131 converts the display data to be displayed in the display unit 103 into an R (Red) signal, a G (Green) signal, and a B (Blue) signal to be output to the display unit 103.

FIG. 2 is a flowchart illustrating an example of a processing operation performed by the image processing system 100.

An operation performed when a user presses a plurality of channel buttons within a predetermined period of time will be described hereinafter.

In step S201, the controller 114 determines whether one of the channel buttons 110A to 110L was pressed by the user.

When the determination is affirmative in step S201, the controller 114 stores a keycode corresponding to the pressed channel button in the storage unit 111 in step S202.

In step S203, the timer 112 starts measuring a predetermined period of time (Tw).

In step S204, the controller 114 determines whether the predetermined period of time Tw, which is a threshold value, has elapsed.

When the determination is negative in step S204, the controller 114 determines whether another channel button different from that pressed in step S201 was pressed in step S205.

When the determination is affirmative in step S205, the process proceeds to step S206 where the controller 114 obtains a keycode corresponding to the channel button pressed in step S205 and stores the keycode in the storage unit 111.

Note that in a case where a plurality of keycodes are stored in the storage unit 111, different keycodes are stored in different storage areas in the storage unit 111, and therefore, information on the keycodes is not rewritten.

When the determination is affirmative in step S204, the controller 114 generates transmission information including all keycodes stored in the storage unit 111 in step S207.

FIG. 3 is a diagram illustrating an example of a format of transmission information generated when the channel buttons 110A, 110B, and 110C are pressed in the predetermined period of time Tw.

In this format, a group start flag and a group end flag are added to the transmission information including keycodes a, b, and c.

Figure 4:
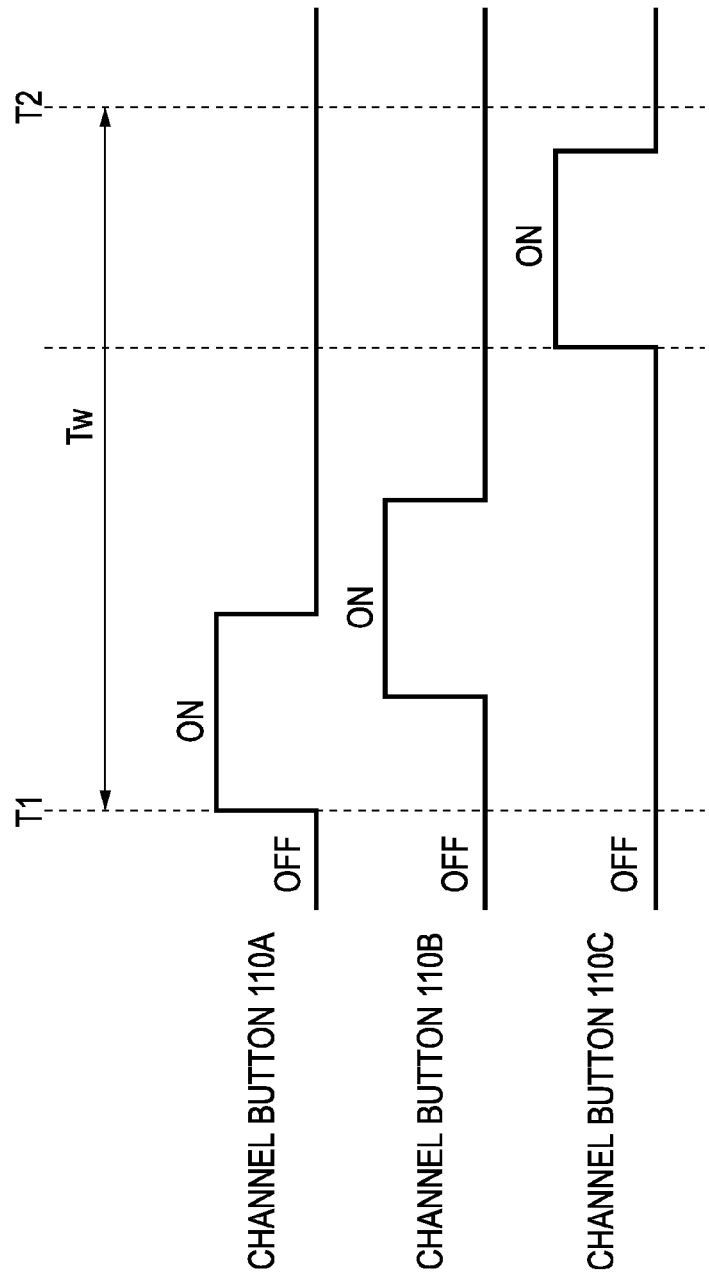
FIG. 4 is a diagram illustrating the relationship between states of channel buttons and Tw timekeeping.

The measurement of the predetermined period of time Tw starts at a time point (T1) at which a state in which none of the channel buttons is pressed is changed to a state in which one of the channel buttons is pressed (turned on) as shown in FIG. 4.

Furthermore, when a plurality of channel buttons are turned on during the predetermined period of time Tw starting from the time point T1 (during a period of time from the time point T1 to a time point T2), the controller 114 stores keycodes corresponding to the pressed channel buttons in the storage unit 111.

In step S208, the controller 114 outputs the transmission information to the transmission unit 113.

In step S209, the transmission unit 113 converts the transmission information into a transmission signal and outputs the transmission signal.

In step S210, the content controller 128 determines whether the receiver 120 received a signal including the keycodes corresponding to the pressed channel buttons.

When the determination is affirmative in step S210, the content controller 128 obtains all the keycodes included in the signal received by the receiver 120 in step S211.

In step S212, the content controller 128 outputs video-obtaining information to the tuner unit 121. The video-obtaining information is used to select broadcast channels corresponding to the keycodes obtained in step S211.

In this embodiment, the video-obtaining information is used to specify a certain frequency band. Note that the video-obtaining information may be replaced by any information for specifying a broadcast channel.

In step S213, the content controller 128 transmits layout information to the scaling unit 126 in accordance with the number of keycodes obtained in step S211.

The layout information includes layout parameters, such as a scaling rate, a display position, transparency, and a display priority used for simultaneously displaying display-element data items of the broadcast channels in the display unit 103.

Note that the operations in step S212 and step S213 are replaceable with each other, and alternatively, these operations may be performed in parallel.

In step S214, the scaling unit 126 generates display-element data items for a plurality of content items in accordance with the layout information received in step S213.

In step S215, the combining unit 127 combines the display-element data items to obtain display data, and supplies the display data to the buffer controller 129.

In step S216, the buffer controller 129 temporarily stores the display data in the buffer 130 in accordance with an output rate, and supplies the display data for a single screen from the buffer 130 to the output unit 131 at a timing when the display data is displayed in the display unit 103.

Figure 5A:
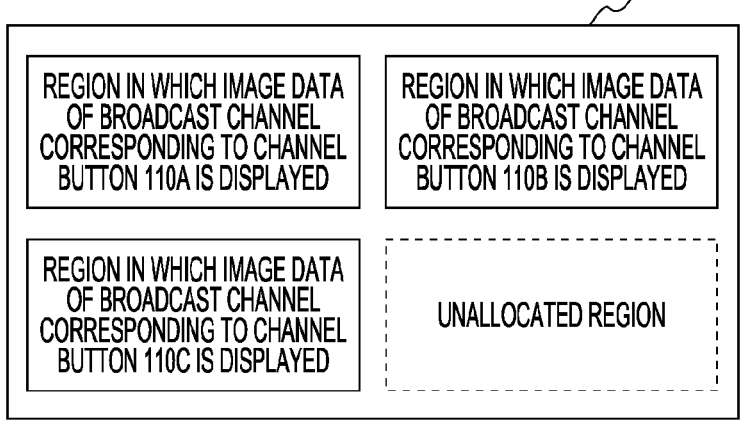
FIGS. 5A to 5C are diagrams illustrating examples of display data displayed in a display unit as multi-screen display.
Figure 5B:
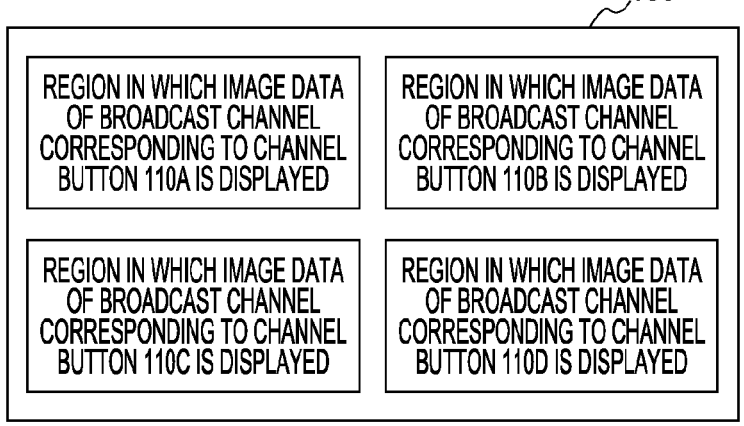
Figure 5C:
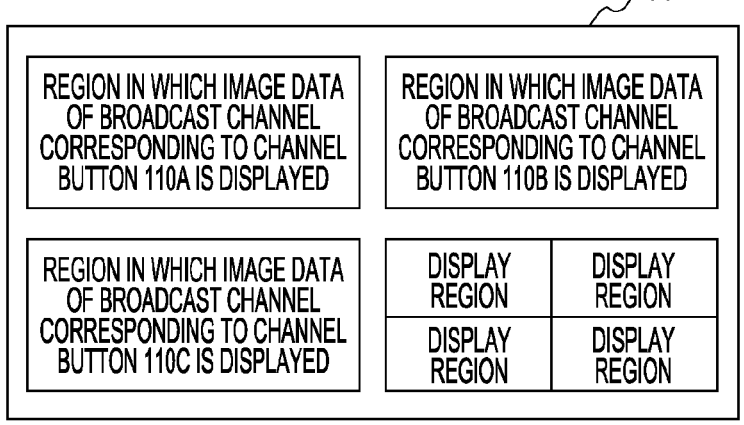

FIGS. 5A to 5C are diagrams illustrating examples of layout of the display data displayed in the display unit 103 when the channel buttons 110A to 110C are pressed in the predetermined period of time Tw.

In FIG. 5A, only images corresponding to broadcast channels specified by the user are arranged in a single screen.

As shown in FIG. 5B, an image corresponding to a broadcast channel which is not specified by the user may be displayed in a lower-right region of the display unit 103 (hereinafter referred to as an "unallocated region") in which image data is not displayed in FIG. 5A.

Furthermore, as the broadcast channel which is not specified by the user, a broadcast channel which is not currently specified by the user and which is determined to have been frequently specified by the user in accordance with history information representing broadcast channels which were specified by the user may be displayed.

Alternatively, as the broadcast channel which is not specified by the user, a broadcast channel which is broadcasting a program in a category similar to a program which is broadcasted in one of the broadcast channels specified by the user may be displayed.

In the unallocated region in the display unit 103 shown in FIG. 5, images corresponding to a plurality of broadcast channels which are not specified by the user may be displayed by being successively switched from one to another.

Alternatively, as shown in FIG. 5C, the unallocated region shown in FIG. 5A may be further divided so as to display images of a plurality of broadcast channels.

When the configuration as shown in FIG. 5B or FIG. 5C is employed, the display unit 103 is effectively utilized.

With this configuration, a plurality of image data items desired by the user are displayed in a single display as multi-screen display by a simple operation.

Next, a case where the image processing system 100 of this embodiment includes a function of generating layout information in accordance with an operation timing, an operation pressure, and a duration of an operation will be described.

In this case, the control unit 101 includes a function of determining an operation timing, an operation pressure, and a duration of an operation, for example, and storing information on the determined operation timing, the determined operation pressure, and the determined duration of an operation, for example (hereinafter referred to as "additional information") in the storage unit 111.

Furthermore, the controller 114 has a function of generating transmission information including all keycodes and all additional information stored in the storage unit 111.

When the receiver 120 received a signal including keycodes and additional information, the content controller 128 supplies the layout information representing a scaling rate, a display position, transparency, and a display priority of display-element data in accordance with the additional information to the scaling unit 126.

Figure 6B:
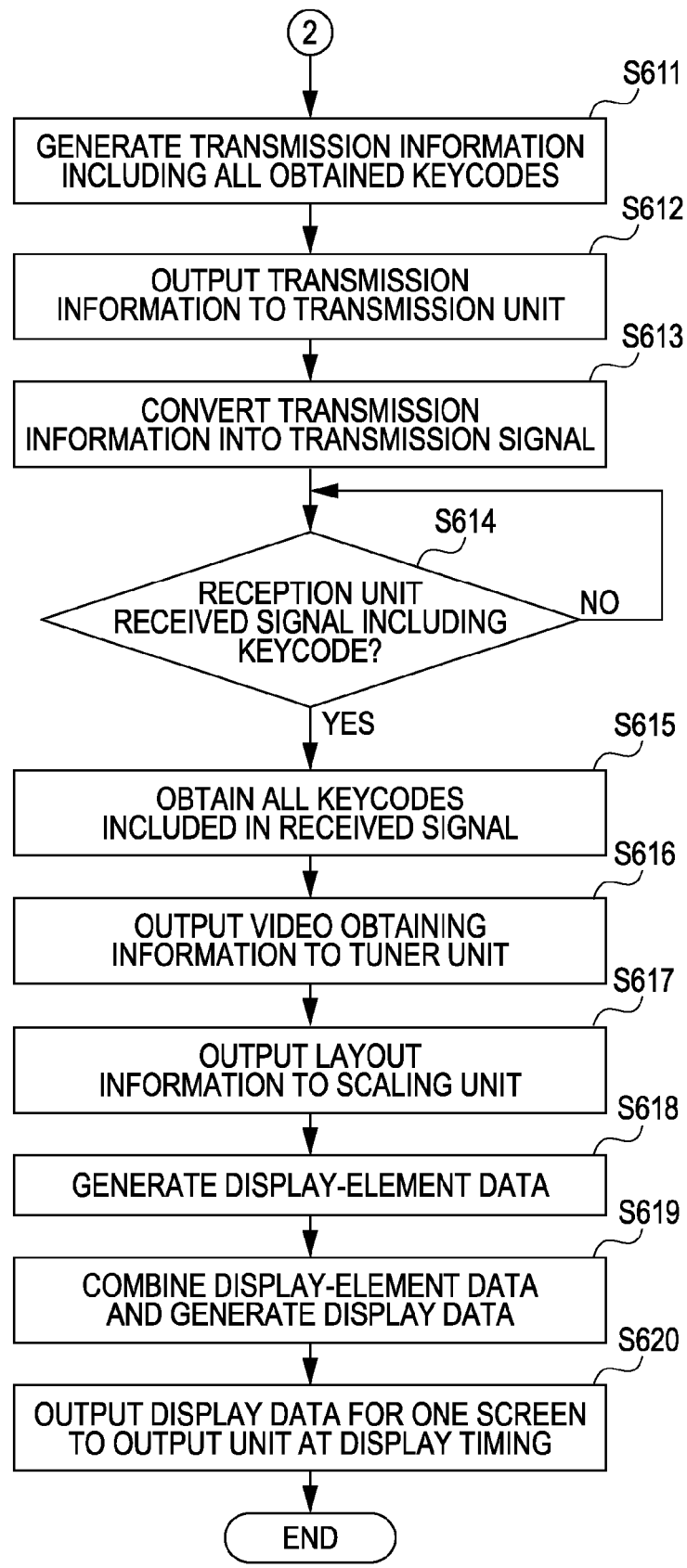
FIG. 6 is a flowchart illustrating an example of a processing operation in a modification of the image processing system according to the first embodiment of the present invention.

FIG. 6 is a flowchart illustrating an example of a processing operation of the image processing system 100 having a function of generating layout information at an operation timing.

Hereinafter, an operation performed when the user pressed a plurality of channel buttons within a predetermined period of time will be described.

In step S601, the controller 114 determines whether the user pressed one of the channel buttons 110A to 110L.

When the determination is affirmative in step S601, the controller 114 stores a keycode corresponding to the pressed channel button in the storage unit 111 in step S602.

In step S603, the timer 112 starts measuring a predetermined period of time (Tw).

In step S604, the timer 112 starts measuring a time difference Td. Note that the time difference Td is a predetermined period of time shorter than the predetermined period of time Tw, and is used to obtain a time difference between timings at which two channel buttons are pressed, the two channel buttons being consecutively operated.

In step S605, the controller 114 determines whether the predetermined period of time Tw has elapsed.

When the determination is negative in step S605, the controller 114 determines whether a channel button different from that pressed in step S601 was pressed in step S606.

When the determination is affirmative in step S606, the process proceeds to step S607 where the controller 114 obtains a keycode corresponding to the channel button pressed in step S606, and stores the keycode in the storage unit 111.

After the keycode is stored in step S607, the controller 114 determines whether the predetermined period of time Td has elapsed in step S608.

When the determination is negative in step S608, the controller 114 stores a keycode representing that the display unit 103 is evenly divided in the storage unit 111 in step S609.

When the determination is affirmative in step S608, the controller 114 stores a keycode representing that the display unit 103 is unevenly divided in the storage unit 111 in step S610.

Note that the keycode stored in step S609 or step S610 corresponds to the keycode corresponding to the channel button stored in step S607.

Then, the timer 112 stops the measurement of the predetermined period of time Td and newly starts the measurement of the predetermined period of time Td in step S604.

When the determination is affirmative in step S605, the controller 114 generates transmission information including all keycodes stored in the storage unit 111 in step S611.

As shown in FIG. 7, a measurement of the predetermined period of time Tw starts at a time point (T1) at which a state in which none channel button is pressed (off state) is changed to a state in which one of the channel buttons is pressed (on state).

As shown in FIG. 7, a first measurement of the predetermined period of time Td starts at a time point (T1) at which one of the channel buttons is pressed (on state), and a second measurement starts at a time point (T3) at which another channel button is pressed (on state).

In step S612, the controller 114 supplies the transmission information to the transmission unit 113.

In step S613, the transmission unit 113 converts the transmission information into a transmission signal and outputs the transmission signal.

In step S614, the content controller 128 determines whether the receiver 120 received the signal including the keycodes corresponding to the channel buttons and the keycode representing the division of the display unit 103.

When the determination is affirmative in step S614, the content controller 128 obtains all the keycodes included in the signal received by the receiver 120 in step S615.

In step S616, the content controller 128 outputs video-obtaining information to the tuner unit 121.

In step S617, the content controller 128 transmits layout information to the scaling unit 126 in accordance with the keycode representing the division of the display unit 103 which is obtained in step S615.

Figure 8A:
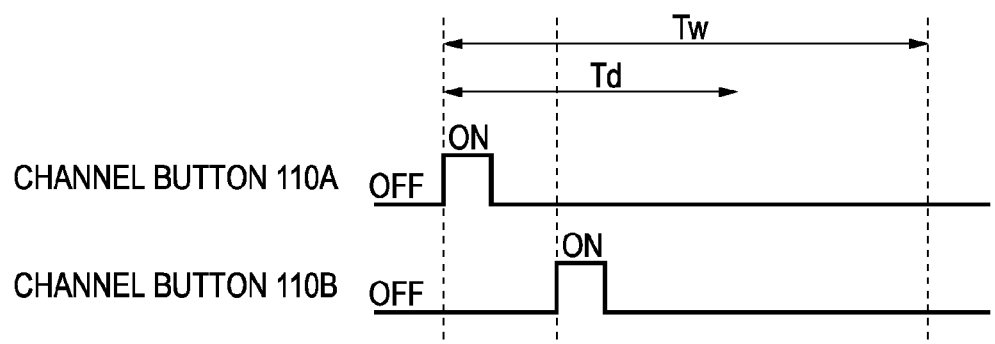
FIGS. 8A to 8F are diagrams illustrating the relationships between the states of the channel buttons and display data displayed in multi-screen.
Figure 8B:
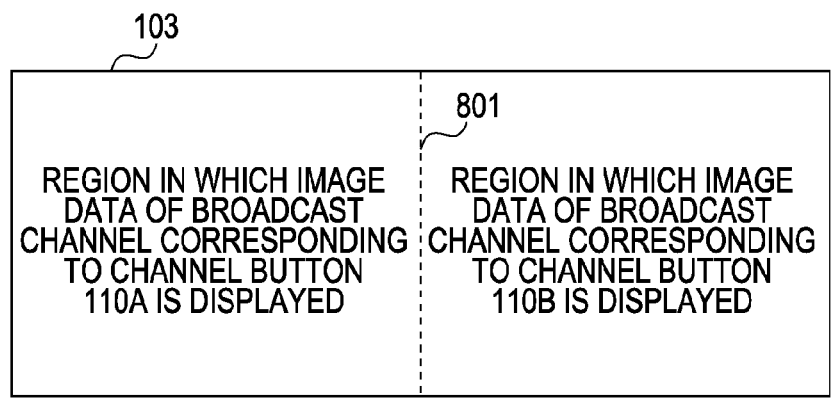

Note that the layout information is used to determine layout of a plurality of display regions using a boundary 801 which evenly divides the display unit 103 in a horizontal direction as shown in FIG. 8B when the channel buttons 110A and 110B are pressed at timings shown in FIG. 8A, for example.

Figure 8C:
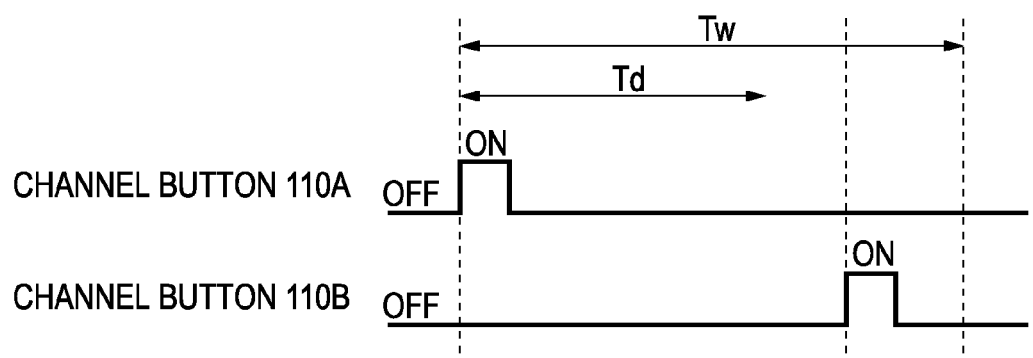
Figure 8D:
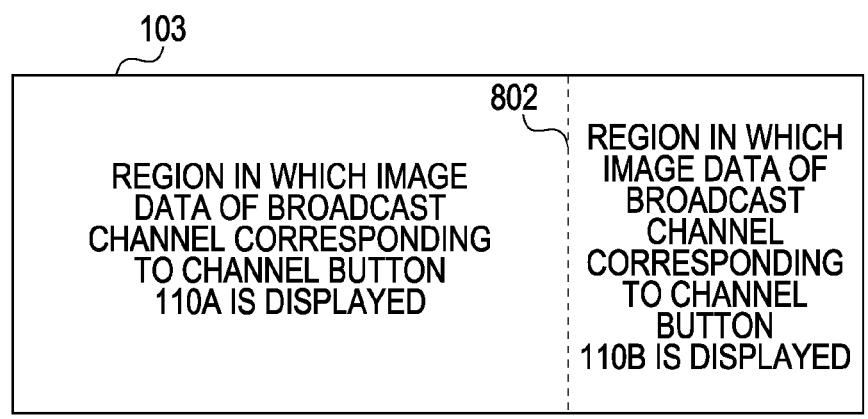

Furthermore, the layout information is used to determine layout of a plurality of display regions using a boundary 802 which unevenly divides the display unit 103 in a horizontal direction as shown in FIG. 8D when the channel buttons 110A and 110B are pressed at timings shown in FIG. 8C, for example.

Figure 8E:
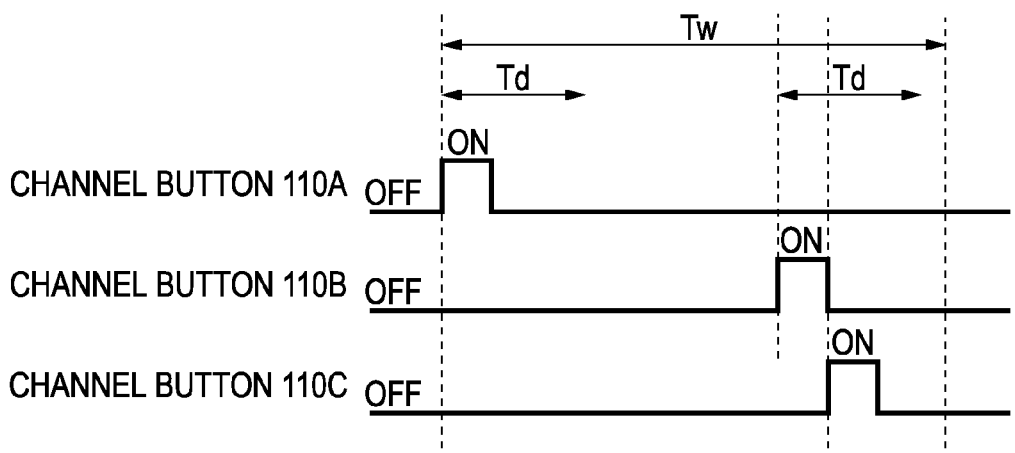
Figure 8F:
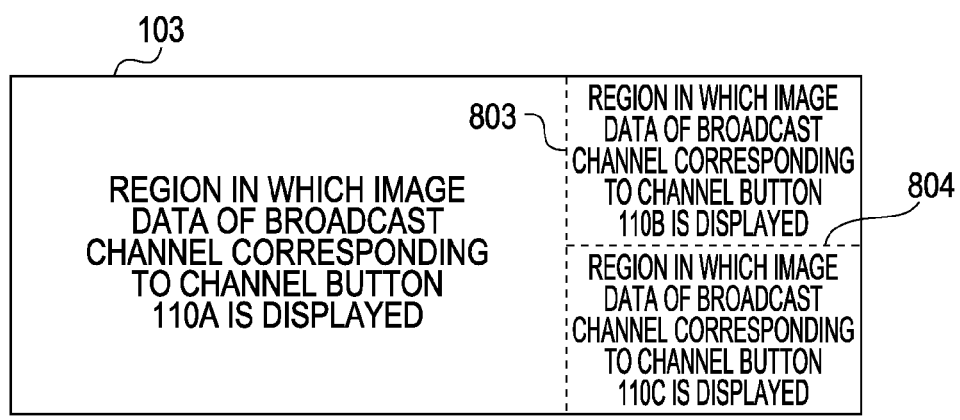

Moreover, the layout information is used to determine layout of a plurality of display regions using a boundary 803 which unevenly divides the display unit 103 into two portions in a horizontal direction and a boundary 804 which evenly divides one of the two portions in a vertical direction as shown in FIG. 8F when the channel buttons 110A to 110C are pressed at timings shown in FIG. 8E, for example.

Note that the layout information may be used by the content controller 128 to select a predetermined layout pattern from among a plurality of layout patterns in accordance with the keycodes included in the signal received by the receiver 120.

Operations in step S618 to step S620 are the same as those in step S214 to step S216, and therefore, descriptions thereof are omitted.

With this configuration, layout of the multi-screen display can be changed by simply changing operation methods.

A second embodiment of the present invention will be described.

The second embodiment is different from the first embodiment of the present invention in that the timer 112 is not included in an image processing system 900.

Figure 9:
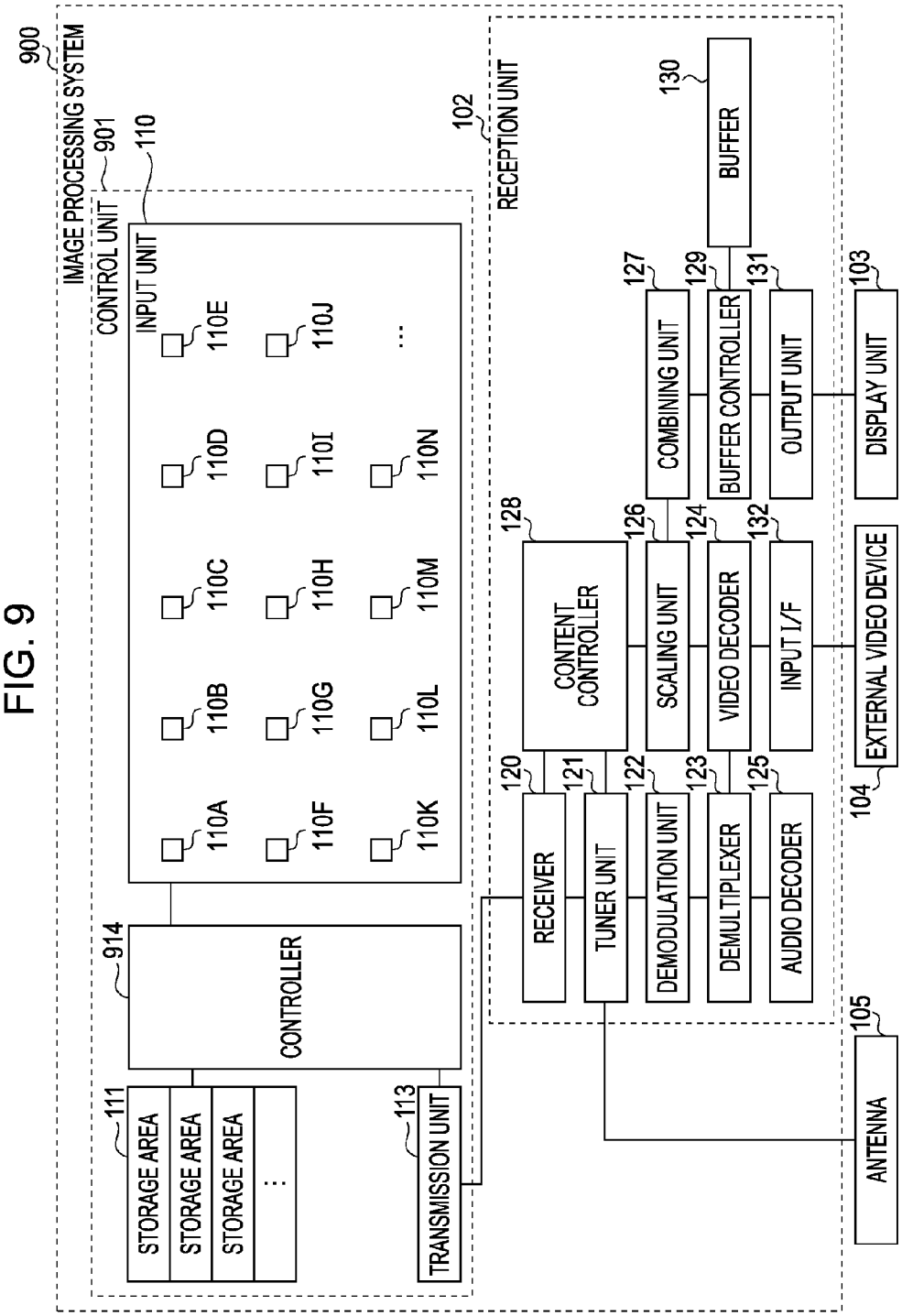
FIG. 9 is a block diagram illustrating an example of a configuration of an image processing system according to a second embodiment of the present invention.

FIG. 9 is a block diagram illustrating an example of a configuration of the image processing system 900 according to the second embodiment of the present invention. Components the same as those shown in FIG. 1 are denoted by reference numerals the same as those shown in FIG. 1, and therefore, descriptions thereof are omitted.

In FIG. 9, the image processing system 900 is different from the image processing system 100 in that a function of a controller 914 shown in FIG. 9 is different from that of the controller 114 shown in FIG. 1.

Hereinafter, a configuration of a control unit 901 will be described.

The controller 914 controls operations of a input unit 110, a storage unit 111, and a transmission unit 113, reads a keycode stored in the storage unit 111, generates transmission information, and supplies the transmission information to the transmission unit 113.

Figure 10:
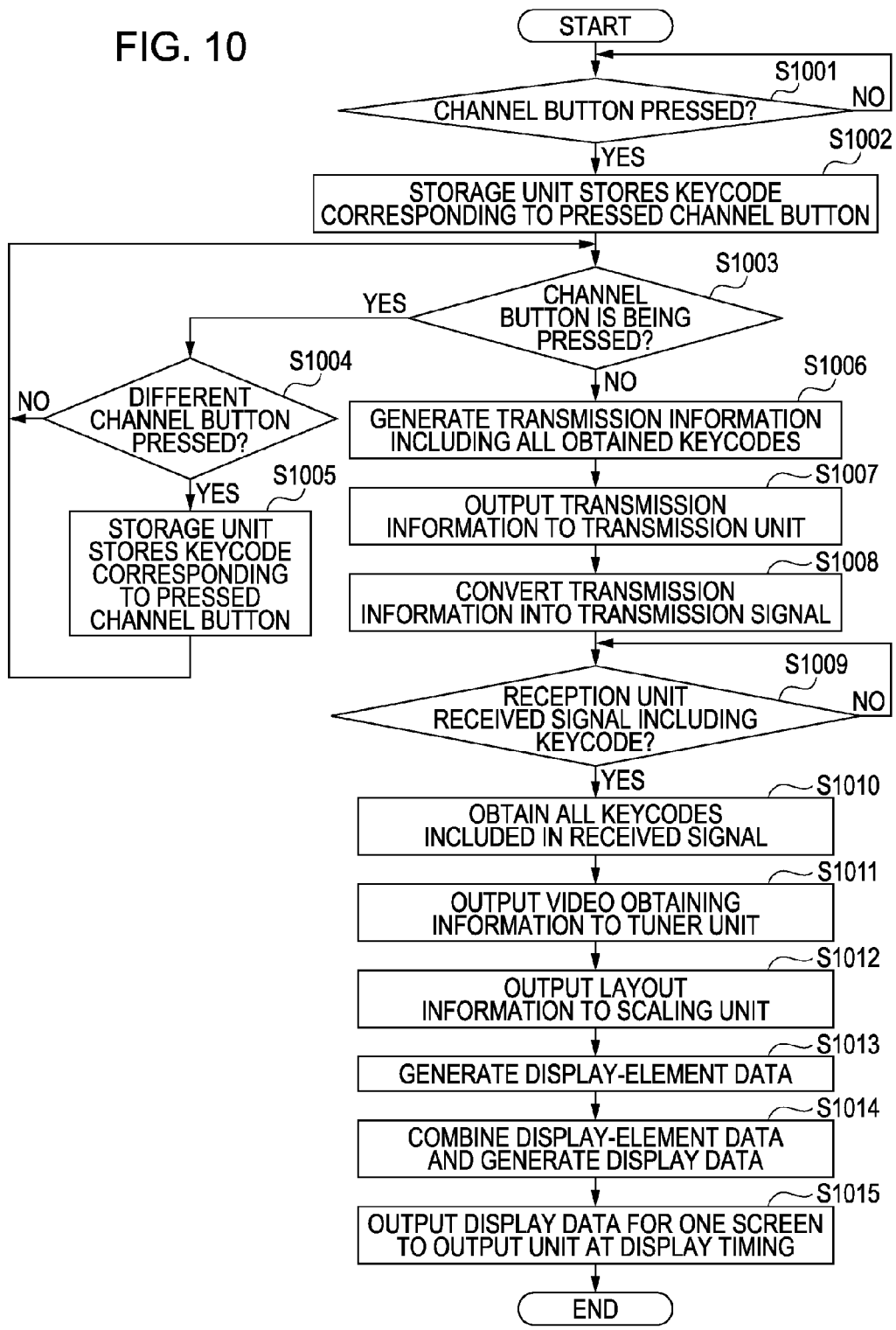
FIG. 10 is a flowchart illustrating an example of a processing operation of the image processing system according to the second embodiment of the present invention.

FIG. 10 is a flowchart illustrating an example of a processing operation of the image processing system 900.

Hereinafter, an operation performed when a user pressed a plurality of channel buttons at predetermined timings will be described.

In step S1001, the controller 914 determines whether one of channel buttons 110A to 110L is pressed by the user.

When the determination is affirmative in step S1001, the controller 914 stores a keycode corresponding to the pressed channel button in the storage unit 111 in step S1002.

In step S1003, the controller 914 determines whether at least one of the channel buttons 110A to 110L is in an pressed state.

When the determination is affirmative in step S1003, the controller 914 determines whether another channel button different from that pressed in step S1001 was pressed in step S1004.

When the determination is affirmative in step S1004, the process proceeds to step S1005 where the controller 914 obtains a keycode corresponding to the channel button newly pressed in step S1004 and stores the keycode in the storage unit 111.

Note that in a case where a plurality of keycodes are stored in the storage unit 111, the different keycodes are stored in different storage areas in the storage unit 111, and therefore, information on the keycodes is not rewritten.

When the determination is negative in step S1003, the controller 914 generates transmission information including all keycodes stored in the storage unit 111 in step S1006.

Operations in step S1007 to step S1015 subsequently performed are the same as those in step S208 to step S216 shown in FIG. 2, and therefore, descriptions thereof are omitted.

Figure 11:
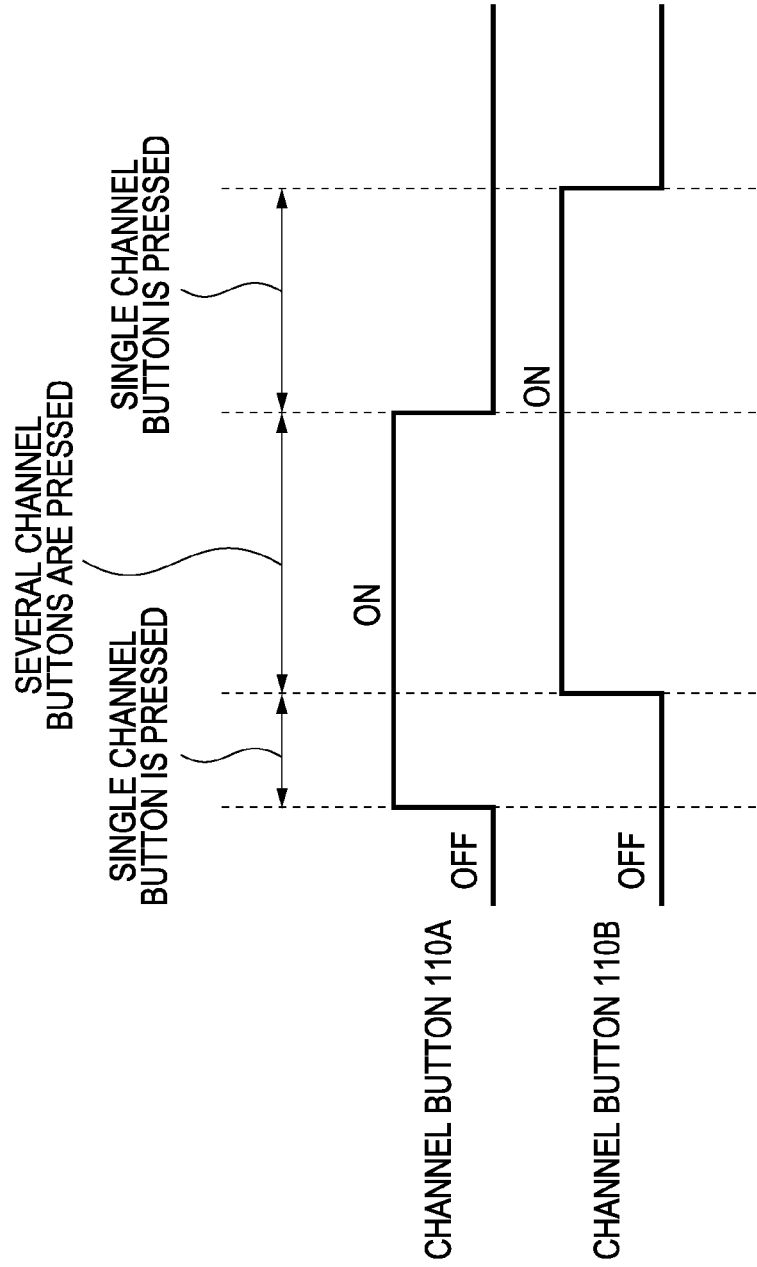
FIG. 11 is a diagram illustrating states of channel buttons.

In this embodiment, as shown in FIG. 11, the operation starts with a state in which none of the channel buttons is pressed (off state) and then a state in which one of the channel buttons is pressed (on state) is detected.

Then, a keycode corresponding to the pressed channel button is stored in a storage region in the storage unit 111.

While the channel button is in a pressed state (on state), if it is determined that another channel button is pressed (on state), a keycode corresponding to the other channel button is stored in another storage region in the storage unit 111.

With this configuration, transmission information is generated (in step S1006) when the user's operation is terminated.

Next, a case where the image processing system 900 of this embodiment further includes a function of generating layout information in accordance with an operation timing, an operation pressure, and a duration of an operation will be described.

In this case, the control unit 901 includes a function of determining an operation timing, an operation pressure, and a duration of an operation, for example, and storing information on the determined operation timing, the determined operation pressure, and the determined duration of an operation, for example (hereinafter referred to as "additional information") in the storage unit 111.

Furthermore, the controller 914 has a function of generating transmission information including all keycodes and all additional information stored in the storage unit 111.

When the receiver 120 received a signal including keycodes and additional information, the content controller 128 supplies layout information representing a scaling rate, a display position, transparency, and a display priority of display-element data in accordance with the additional information to a scaling unit 126.

Figure 12B:
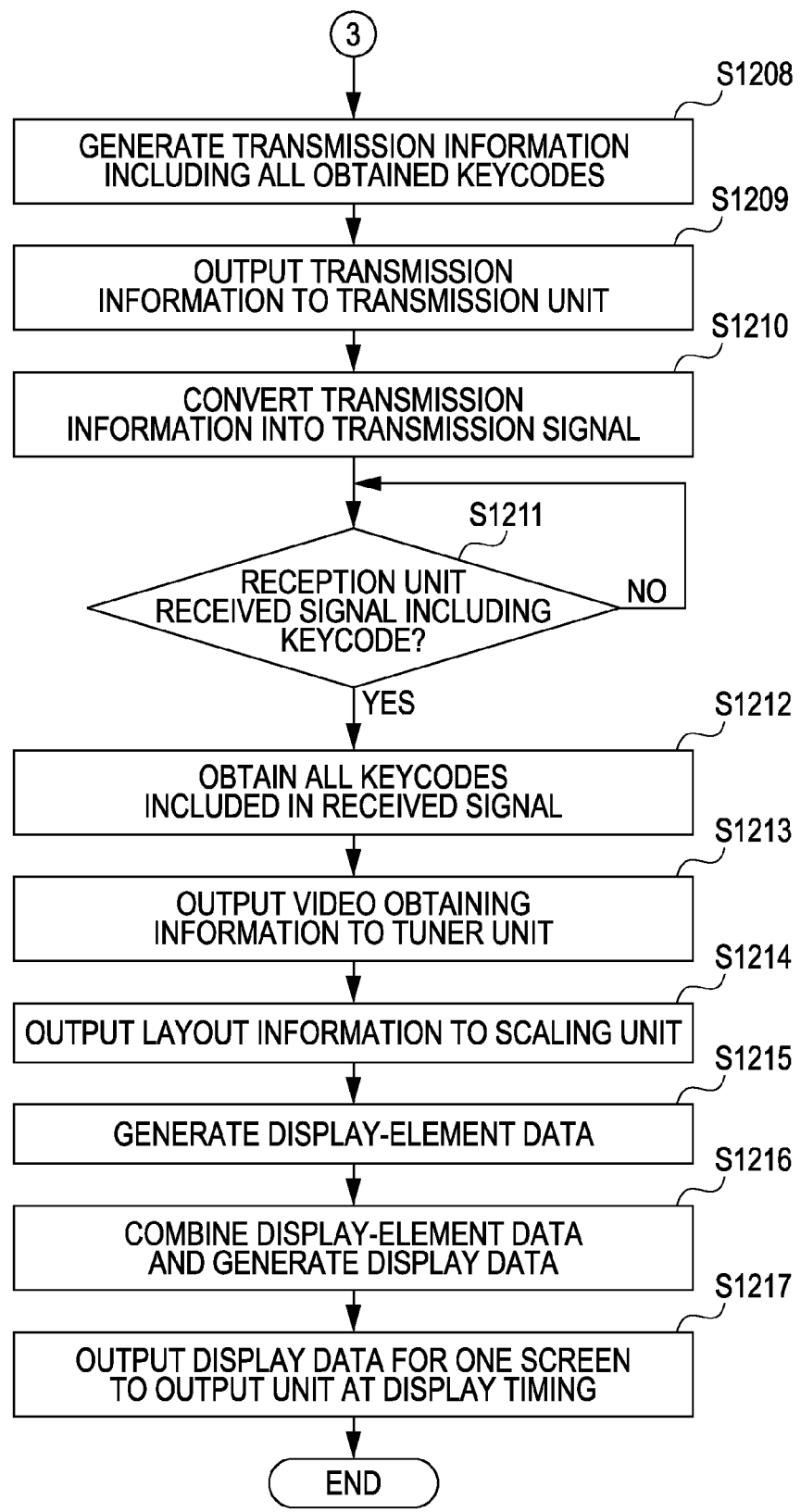
FIG. 12 is a flowchart illustrating an example of a processing operation of a modification of the image processing system according to the second embodiment of the present invention.

FIG. 12 is a flowchart illustrating an example of a processing operation of the image processing system 900 having a function of generating layout information on the basis of an duration of an operation.

Hereinafter, an operation performed when the user pressed a plurality of channel buttons at predetermined timings will be described.

In step S1201, the controller 914 determines whether the user pressed one of the channel buttons 110A to 110L.

When the determination is affirmative in step S1201, the controller 914 stores a keycode corresponding to the pressed channel button in the storage unit 111 in step S1202.

In step S1203, the controller 914 determines whether the one of the channel buttons 110A to 110L is in an pressed state.

When the determination is affirmative in step S1203, the controller 914 determines whether another channel button which is different from the channel button pressed in step S1201 was pressed in step S1204.

When the determination is affirmative in step S1204, the controller 914 obtains a keycode corresponding to the channel button newly pressed in step S1204 and stores the keycode in the storage unit 111 in step S1205.

In step S1206, it is determined whether the user's operation performed on the channel button in step S1201 or step S1204 is terminated.

When the determination is affirmative in step S1206, the controller 914 obtains the keycode corresponding to the channel button which is determined that the pressed state thereof is cancelled in step S1206, and stores the keycode in the storage unit 111 in step S1207.

Note that when the keycode is stored in step S1207, information on the termination of the operation is added to the keycode.

When the determination is negative in step S1203, the controller 914 generates transmission information including all keycodes stored in the storage unit 111 in step S1208.

In step S1209, the controller 914 supplies the transmission information to the transmission unit 113.

In step S1210, the transmission unit 113 converts the transmission information into a transmission signal and outputs the transmission signal.

In step S1211, the content controller 128 determines whether the receiver 120 received a signal including the keycodes corresponding to channel buttons.

When the determination is affirmative in step S1211, the content controller 128 obtains all the keycodes included in the signal received by the receiver 120 in step S1212.

In step S1213, the content controller 128 outputs video-obtaining information to a tuner unit 121.

In step S1214, the content controller 128 transmits layout information to the scaling unit 126 in accordance with arrangement of the keycodes obtained in step S1212.

Figure 13A:
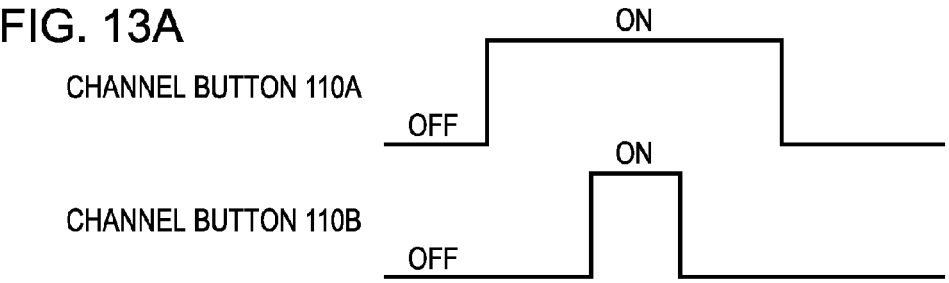
FIGS. 13A to 13F are diagrams illustrating the relationships among the states of the channel buttons, transmission information, and display data displayed as multi-screen display.
Figure 13B:
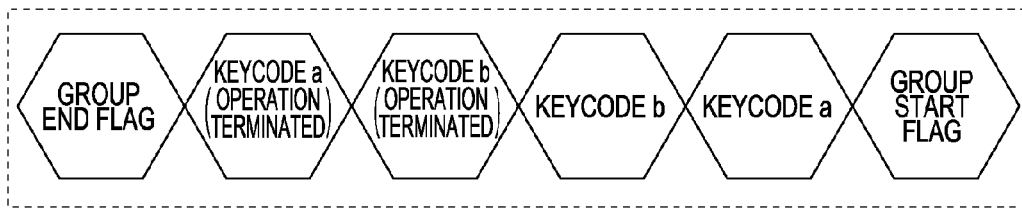
Figure 13C:
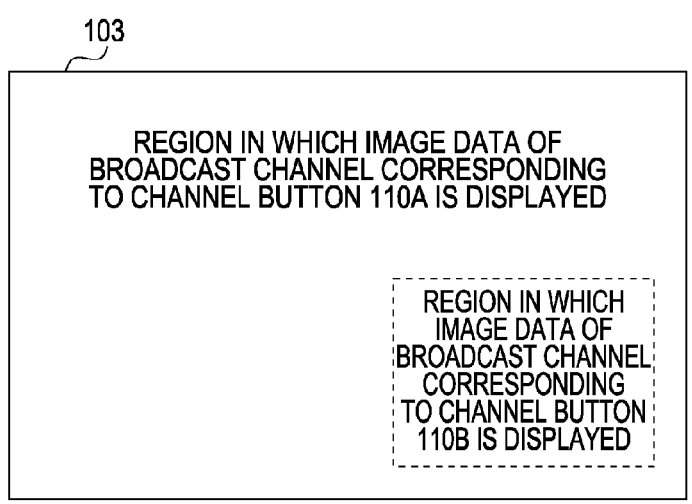

In a case where channel buttons 110A and 110B are pressed at timings shown in FIG. 13A, the transmission signal has a format as shown in FIG. 13B.

In this case, as layout for display in the display unit 103, a display region corresponding to the channel button 110A which has a longer duration time of the operation is larger than a display region corresponding to the channel button 110B which has a shorter duration time of the operation.

Furthermore, a portion of the rectangular display region corresponding to the channel button 110A is arranged as background of the rectangular display region corresponding to the channel button 110B.

Figure 13D:
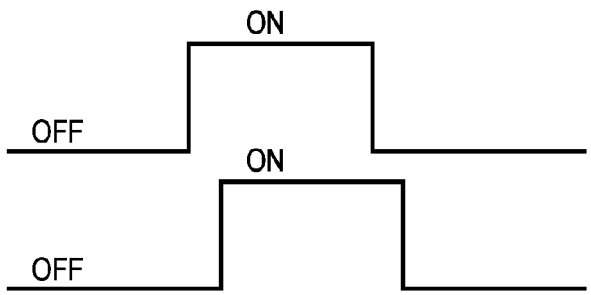
Figure 13E:
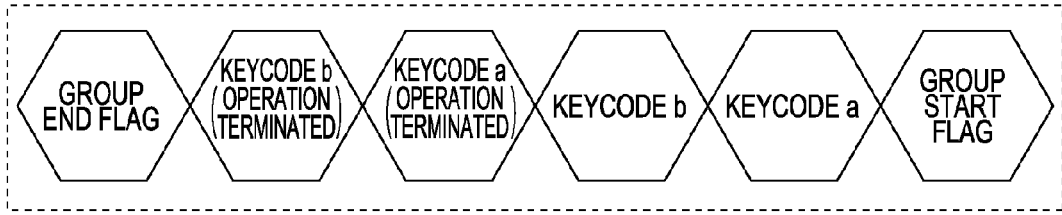
Figure 13F:
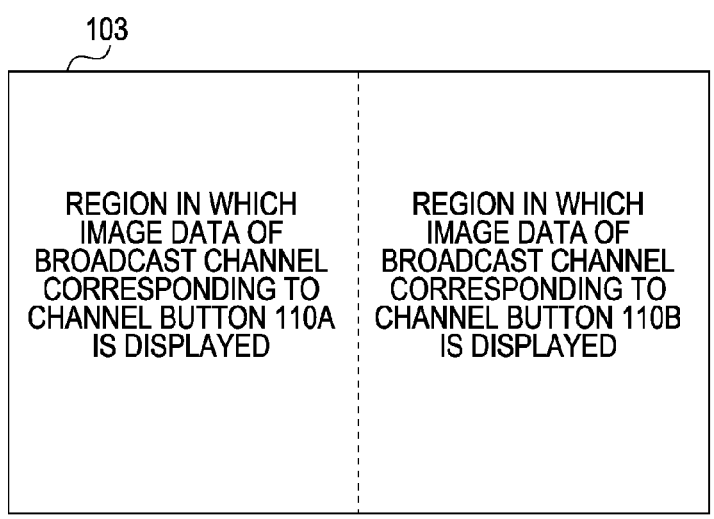

In a case where channel buttons 110A and 110B are pressed at timings shown in FIG. 13D, the transmission signal has a format as shown in FIG. 13E.

In this case, as layout for display in the display unit 103, the size of a display region corresponding to the channel button 110A is equal to the size of a display region corresponding to the channel button 110B.

The display region corresponding to the channel button 110A and the display region corresponding to the channel button 110B are horizontally arranged in parallel.

Operations in step S1215 to step S1217 which are subsequently performed are the same as those in step S214 to step S216, and therefore, descriptions thereof are omitted.

With this configuration, layout of the multi-screen display can be changed by simply changing operation methods.

A third embodiment will now be described.

The third embodiment is different from the first embodiment in that keycodes for specifying predetermined content items, instead of predetermined broadcast channels, are assigned to channel buttons.

Note that the content items correspond to television broadcast programs or image data items stored in an external video device 104, such as a hard disk recorder.

Figure 14:
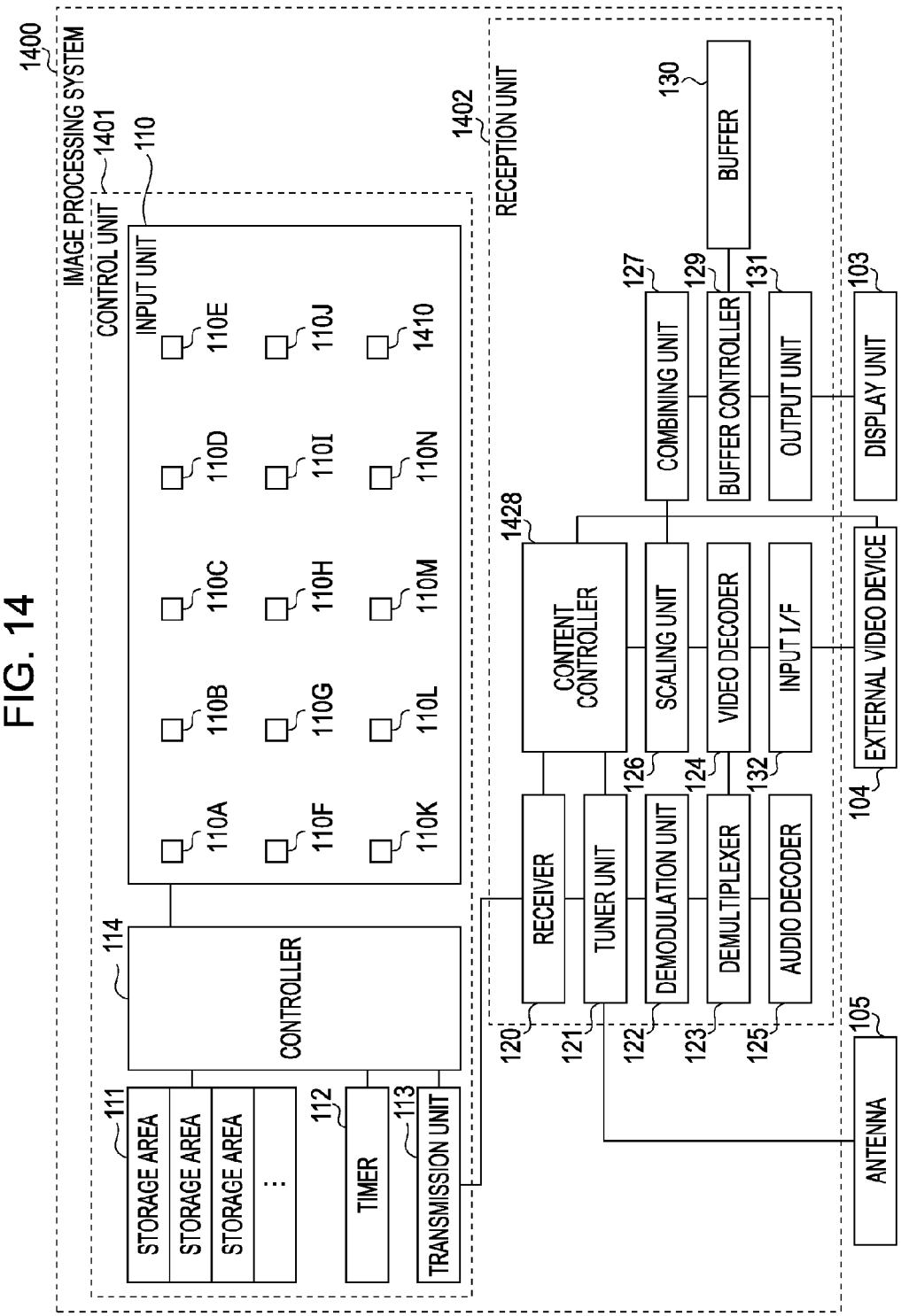
FIG. 14 is a block diagram illustrating an example of a configuration of an image processing system according to a third embodiment of the present invention.

FIG. 14 is a block diagram illustrating an example of a configuration of an image processing system 1400 according to a third embodiment of the present invention. Components the same as those shown in FIG. 1 are denoted by reference numerals the same as those shown in FIG. 1, and therefore, descriptions thereof are omitted.

In FIG. 14, the image processing system 1400 is different from the image processing system 100 shown in FIG. 1 in that an input unit 110 includes a list-display button 1410.

Hereinafter, a configuration of a control unit 1401 will be described.

The list-display button 1410 corresponds to a keycode for displaying a plurality of content items which can be displayed in the display unit 103 as a list.

Note that, instead of the list-display button 1410, an operation of pressing a plurality of buttons at the same time may correspond to a keycode for displaying a plurality of content items as a list.

FIG. 15 is a flowchart illustrating an example of a processing operation of the image processing system 1400.

Hereinafter, an operation in a case where a user presses the list-display button 1410 will be described. Furthermore, an operation performed when the user presses a plurality of channel buttons within a predetermined period of time will be described.

In step S1501, a content controller 1428 determines whether a receiver 120 received a signal including a keycode corresponding to the list-display button 1410.

When the determination is affirmative in step S1501, the content controller 1428 supplies video-obtaining information for obtaining content items to be displayed as a list to the tuner unit 121 in step S1502.

If image data items stored in an external video device 104 are to be displayed in the display unit 103 as a list, the content controller 1428 supplies the video-obtaining information to the external video device 104 in step S1502.

In step S1503, the content controller 1428 supplies layout information used when the content items are displayed in the display unit 103 as a list to a scaling unit 126.

In step S1504, the scaling unit 126 generates a plurality of display-element data items for the content items in accordance with the layout information received in step S1503.

In step S1505, channel buttons 110A to 110L are associated with the respective display-element data items.

In step S1506, a combining unit 127 combines the plurality of display-element data items to generate display data and supplies the display data to a buffer controller 129.

In step S1507, the buffer controller 129 temporarily stores the display data in a buffer 130 in accordance with an output rate and supplies the display data for a single screen from the buffer 130 to an output unit 131 at a timing in which the display data is displayed in the display unit 103.

Figure 16A:
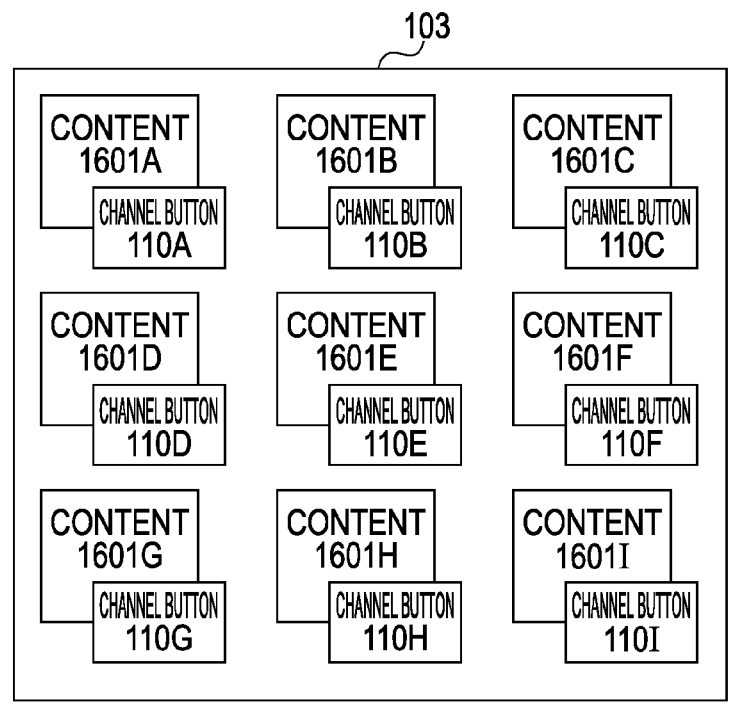
FIGS. 16A and 16B are diagrams illustrating examples of display data displayed in a display unit of the image processing system according to the third embodiment of the present invention.

The display data to be displayed in the display unit 103 is configured such that content images 1601A to 1601L are associated with the predetermined channel buttons channel buttons 110A to 110L as shown in FIG. 16A.

In step S1508, the content controller 1428 determines whether the receiver 120 received a signal including at least one of the keycodes corresponding to the channel buttons 110A to 110L.

When the determination is affirmative in step S1508, the content controller 1428 outputs layout information to the scaling unit 126 in accordance with the number of obtained keycodes in step S1509.

In step S1510, the scaling unit 126 generates display-element data items for the individual content items in accordance with the layout information.

In step S1511, the combining unit 127 combines at least one of the display-element data items to obtain display data and outputs the display data to the buffer controller 129.

In step S1512, the buffer controller 129 temporarily stores the display data in the buffer 130 in accordance with an output rate and supplies the display data for a signal screen from the buffer 130 to the output unit 131 at a timing in which the display data is displayed in the display unit 103.

Figure 16B:
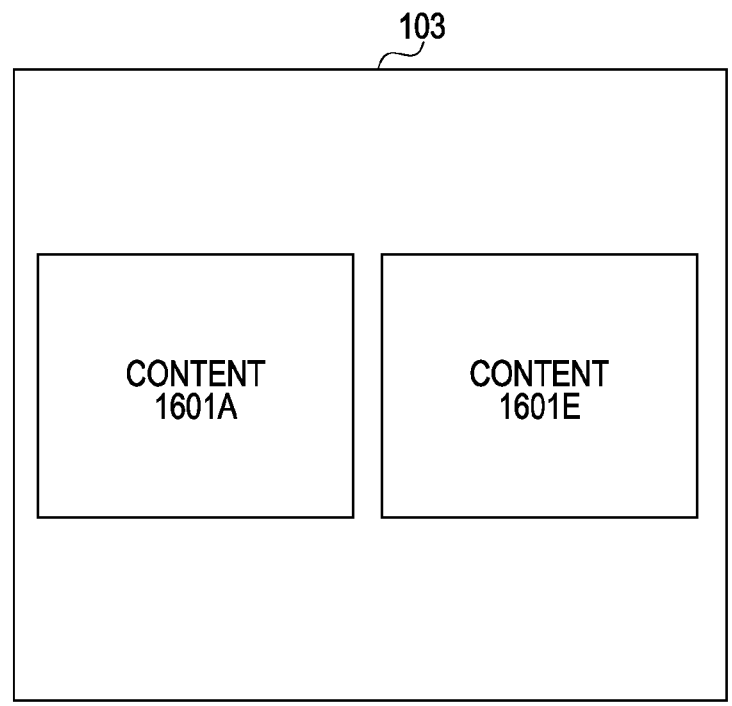

The display data is displayed in the display unit 103 such that, as shown in FIG. 16B, the content items corresponding to the keycodes obtained in step S1508 are displayed as multi-screen display.

With this configuration, the user can check detailed information on a plurality of content items displayed as a list and select at least one content item to be displayed in the display unit 103 from among the plurality of content items by a simple operations.

A fourth embodiment of the present invention will be described.

The fourth embodiment is different from the first embodiment in that some (the storage unit 111 and the timer 112) of the function modules included in the control unit 101 in the first embodiment are included in a reception unit 1702.

Figure 17:
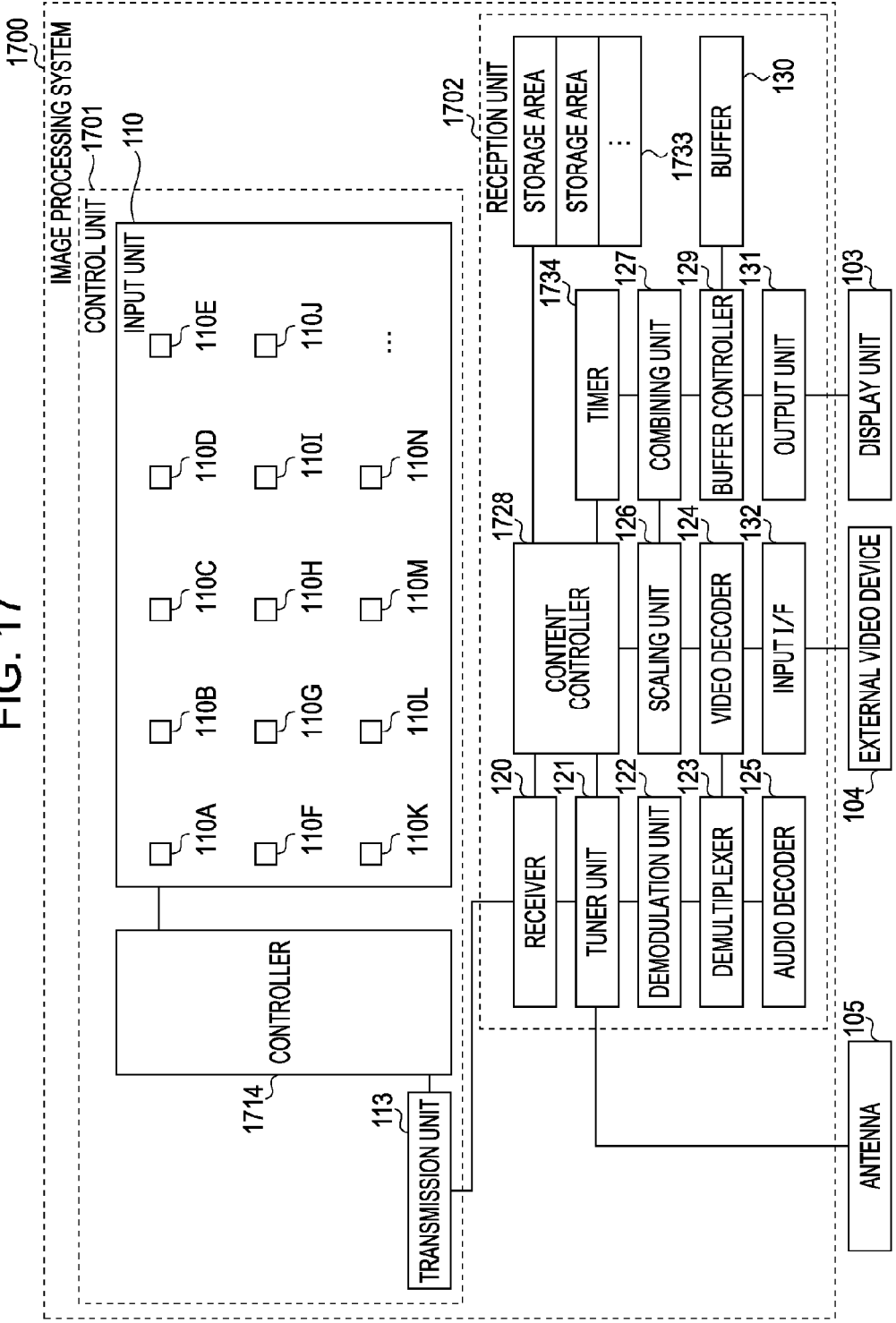
FIG. 17 is a block diagram illustrating an example of a configuration of an image processing system according to a fourth embodiment of the present invention.

FIG. 17 is a block diagram illustrating an example of a configuration of an image processing system 1700 according to the fourth embodiment of the present invention. Components the same as those shown in FIG. 1 are denoted by reference numerals the same as those shown in FIG. 1, and therefore, descriptions thereof are omitted.

In FIG. 17, the image processing system 1700 is different from the image processing system 100 shown in FIG. 1 in that although the control unit 101 includes the storage unit 111 and the timer 112 in FIG. 1, the reception unit 1702 includes a storage unit 1733 and a timer 1734.

A configuration of a control unit 1701 will be described.

The controller 1714 controls operations of an input unit 110 and an transmission unit 113, reads a keycode corresponding to a button which is pressed by a user, generates transmission information, and supplies the transmission information to the transmission unit 113.

A configuration of the reception unit 1702 will be described.

When a reception unit 102 received a signal including a keycode specifying a broadcast channel, the keycode is stored in the storage unit 1733. Note that the storage unit 1733 includes a plurality of storage regions to store keycodes.

The timer 1734 starts timekeeping when the signal including a keycode specifying a broadcast channel is first received after a predetermined period of time in which the signal has not been received is elapsed. The timer 1734 stops the timekeeping after a predetermined period of time.

A content controller 1728 controls operations of a receiver 120, a tuner unit 121, a scaling unit 126, the storage unit 1733, and the timer 1734.

Furthermore, the content controller 1728 supplies video-obtaining information used to select broadcast channels corresponding to keycodes stored in the storage unit 1733 within a predetermined period of time to the tuner unit 121.

FIG. 18 is a flowchart illustrating an example of a processing operation of the image processing system 1700.

Hereinafter, an operation performed when the receiver 120 received a plurality of signals including keycodes corresponding to channel buttons within a predetermined period of time will be described.

In step S1801, the content controller 1728 determines whether the receiver 120 received a signal including a keycode corresponding to one of channel buttons 110A to 110L.

When the determination is affirmative in step S1801, the content controller 1728 stores the keycode in the storage unit 1733 in step S1802.

In step S1803, the timer 1734 starts measuring a predetermined period of time (Tw).

In step S1804, the content controller 1728 determines whether the predetermined period of time Tw has elapsed.

When the determination is negative in step S1804, the content controller 1728 determines whether a signal including a keycode different from the keycode received by the receiver 120 in step S1801 was received in step S1805.

When the determination is affirmative in step S1805, the content controller 1728 stores the keycode included in the signal in the storage unit 1733 in step S1806.

Note that in a case where a plurality of keycodes are stored in the storage unit 1733, the different keycodes are stored in different storage areas in the storage unit 1733, and therefore, information on the keycodes is not rewritten.

When the determination is affirmative in step S1804, the content controller 1728 obtains all keycodes stored in the storage unit 1733 in step S1807.

In step S1808, the content controller 1728 supplies video-obtaining information to the tuner unit 121. The video-obtaining information is used to select broadcast channels corresponding to the keycodes obtained in step S1807.

Furthermore, in this embodiment, the video-obtaining information is used to specify a certain frequency band. Note that the video-obtaining information may be replaced by any information for specifying a broadcast channel.

In step S1809, the content controller 1728 transmits layout information to the scaling unit 126 in accordance with the number of keycodes obtained in step S1807.

Note that the operations in step S1808 and step S1809 are replaceable, and alternatively, these operations may be performed in parallel.

In step S1810, the scaling unit 126 generates display-element data items for a plurality of content items in accordance with the layout information received in step S1809.

In step S1811, the combining unit 127 combines the display-element data items to obtain display data, and supplies the display data to the buffer controller 129.

In step S1812, the buffer controller 129 temporarily stores the display data in a buffer 130 in accordance with an output rate, and supplies the display data for a single screen from the buffer 130 to the output unit 131 at a timing when the display data is displayed in the display unit 103.

With this configuration, when signals including keycodes specifying a plurality of broadcast channels are transmitted from the control unit 1701, the broadcast channels are displayed as multi-screen display.

The embodiments of the present invention are described hereinabove, and the present invention may be applicable to a system including a plurality of apparatus or to a single apparatus.

Note that the present invention may be realized by obtaining programs which realize the functions described in the foregoing embodiments through a network or various storage media and executing the programs by a processing apparatus, such as a computer.

It is apparent that advantages of the present invention are attained as follows. That is, a recording medium (or storage medium) which records program code (computer program) which realizes the functions of the foregoing embodiments is supplied to a system or an apparatus. It is apparent that the storage medium is a computer readable storage medium. A computer (or a CPU or MPU) included in the system or the apparatus reads and executes the program code stored in the recording medium. In this case, the program code itself read from the recording medium realizes the functions of the foregoing embodiments, and therefore, the recording medium including the program code is included in the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171736, filed Jun. 30, 2008, which is hereby incorporated by reference herein in its entirety.

What is claimed is:

1. An image processing apparatus comprising:
    a reception unit configured to receive an operation by a user corresponding to each of plural broadcast channels;
    an obtaining unit configured to obtain an image data item from the broadcast channel corresponding to the operation received by the reception unit; and
    a display control unit configured to determine a layout depending on a number of the operations received by the reception unit and display the image data items corresponding to the operation which is obtained by the obtaining unit on a display,
    wherein the display control unit displays a first image corresponding to a first operation and a second image corresponding to a second operation on the display in a case where the reception unit receives the first operation and the second operation within a predetermined period of time.

2. An image processing method for an image processing apparatus, the method comprising:
    receiving an operation by a user corresponding to each of plural broadcast channels;
    obtaining an image data item from the broadcast channel corresponding to the operation received; and determining a layout depending on a number of the operations received and display the image data items corresponding to the operation which is obtained on a display, wherein performs displaying such that a first image corresponding to a first operation and a second image corresponding to a second operation are included on the display in a case where the first operation and the second operation are received within a predetermined period of time.

3. A non-transitory computer-readable medium encoded with a computer program which makes a computer perform the image processing method set forth in claim 2.

4. An image processing system comprising:
a reception unit configured to receive an operation by a user corresponding to each of plural broadcast channels;
an obtaining unit configured to obtain an image data item from the broadcast channel corresponding to the operation received by the reception unit; and
a display control unit configured to determine a layout depending on a number of the operations received by the reception unit and display the image data item corresponding to the operation which is obtained by the obtaining unit on a display,
wherein the display control unit performs displaying such that a first image corresponding to a first operation and a second image corresponding to a second operation are included on the display in a case where the reception unit receives the first operation and the second operation within a predetermined period of time.

5. A method for controlling an image processing apparatus, comprising:
receiving an operation by a user corresponding to each of plural broadcast channels;
obtaining an image data item from the broadcast channel corresponding to the operation received; and
determining a layout depending on a number of the operations received and display the image data item corresponding to the operation which is obtained on a display,
wherein perform displaying such that a first image corresponding to a first operation and a second image corresponding to a second operation are included on the display in a case where the first operation and a second operation are received within a predetermined period of time.

6. A non-transitory computer-readable medium encoded with a computer program which makes a computer perform the method for controlling an image processing apparatus set forth in claim 5.

7. The image processing apparatus according to claim 1, wherein in a case where the reception unit receives the first operation and the second operation within the predetermined period of time, the display control unit determines a first display area for displaying the first image and a second display area for displaying the second image, based on time elapsed between the reception of the first operation and the reception of the second operation.

8. The image processing apparatus according to claim 7, wherein the display control unit determines the first display area and the second display area such that a size of the first display area and a size of the second display area are even, in a case where the time elapsed between the reception of the first operation and the reception of the second operation is shorter than a first predetermined period of time.

9. The image processing apparatus according to claim 7, wherein the display control unit determines the first display area and the second display area such that a size of the second display area is larger than a size of the first display area, in a case where the time elapsed between the reception of the first operation and the reception of the second operation is longer than a first predetermined period of time and shorter than the predetermined period of time.

10. The image processing apparatus according to claim 1, wherein in a case where the reception unit receives the first operation and the second operation within the predetermined period of time, the display control unit determines a first display area for displaying the first image and a second display area for displaying the second image, based on a time difference between a first time indicating a duration time of an operation for inputting the first operation to the reception unit and a second time indicating a duration time of an operation for inputting the second operation to the reception unit.

11. The image processing apparatus according to claim 10, wherein the display control unit determines the first display area and the second display area such that a size of the first display area and a size of the second display area are even, in a case where the time difference between the first time and the second time is shorter than a second predetermined period of time.

12. The image processing apparatus according to claim 10, wherein the display control unit determines the first display area and the second display area such that a size of the second display area is larger than a size of the first display area, in a case where the time difference between the first time and the second time is longer than a second predetermined period of time and is shorter than the predetermined period of time.

13. The image processing apparatus according to claim 10, wherein the display control unit performs display such that a portion of the first display area for displaying the first image is displayed as a background of the second image, in a case where the time difference between the first time and the second time is longer than a second predetermined period of time and is shorter than the predetermined period of time.

14. A control apparatus comprising:
an obtaining unit configured to obtain an operation corresponding to each of plural broadcast channels, by a user's operation; and
a transmission unit configured to transmit layout information for determining a layout for displaying, on a display, the image data item corresponding to the operation, based on a number of the operations obtained by the obtaining unit,
wherein the transmission unit transmits layout information for performing displaying such that a first image corresponding to a first operation and a second image corresponding to a second operation are included on the display in a case where the obtaining unit obtains a first operation and a second operation within a predetermined period of time.

15. The image processing apparatus according to claim 1, wherein the display control unit determines the layout depending on at least one of a pressure, a timing, and a duration time of the operation received by the reception unit.

16. The image processing apparatus according to claim 1, wherein the display control unit determines transparency of the image data item obtained by the obtaining unit.

* * * * *